United States Patent
Tomita et al.

(10) Patent No.: US 9,526,128 B2
(45) Date of Patent: Dec. 20, 2016

(54) BASE STATION APPARATUS

(71) Applicant: FUJITSU LIMITED, Kawasaki-shi, Kanagawa (JP)

(72) Inventors: Tetsuo Tomita, Setagaya (JP); Hiroaki Takashima, Kawasaki (JP); Kenji Arai, Yokohama (JP); Koichi Hiramoto, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/925,448

(22) Filed: Oct. 28, 2015

(65) Prior Publication Data
US 2016/0143051 A1 May 19, 2016

(30) Foreign Application Priority Data

Nov. 17, 2014 (JP) .................................. 2014-233040

(51) Int. Cl.
*H04W 72/00* (2009.01)
*H04W 88/08* (2009.01)

(52) U.S. Cl.
CPC .................................. *H04W 88/08* (2013.01)

(58) Field of Classification Search
CPC ... H04W 72/1263; H04W 72/12; H04W 88/08
USPC .............................................. 455/452.1–460
See application file for complete search history.

(56) References Cited

U.S. PATENT DOCUMENTS

| | | | | |
|---|---|---|---|---|
| 8,446,903 | B1* | 5/2013 | Ranganathan | H04L 49/109 370/359 |
| 2009/0239576 | A1* | 9/2009 | Liao | H04M 1/72522 455/552.1 |
| 2010/0067426 | A1* | 3/2010 | Voschina | H04W 88/08 370/313 |
| 2010/0311467 | A1* | 12/2010 | Wu | H04W 8/205 455/558 |
| 2013/0340059 | A1* | 12/2013 | Christopher | H04W 12/04 726/7 |
| 2016/0088589 | A1* | 3/2016 | Park | H04W 24/02 455/452.1 |
| 2016/0135174 | A1* | 5/2016 | Lee | H04W 72/0426 370/329 |

FOREIGN PATENT DOCUMENTS

| | | | | |
|---|---|---|---|---|
| JP | 2009-38692 | | 2/2009 | |
| JP | 2009038692 | A * | 2/2009 | ............ H04W 24/00 |
| JP | 2012-85155 | | 4/2012 | |

* cited by examiner

*Primary Examiner* — Shahriar Behnamian
(74) *Attorney, Agent, or Firm* — Fujitsu Patent Center

(57) ABSTRACT

A REC unit manages card information on each of L1 cards handling a physical channel, L2-1 cards handling a logical channel, and L2-2 cards in which a scheduling function for communication processing performed with respect to the L1 card and/or the L2-1 card is implemented. A call control card of the REC unit selects, for each of first to third channels, a processing card establishing a signal path relevant to the logical channel from among the L1 card, the L2-1 card, and the L2-2 card. The call control card transmits connection relation information indicating a combination of the processing cards selected to each processing card. On the basis of the connection relation information received from the call control card, each processing card establishes the signal path for each of the first to third channels relevant to the logical channel between the processing cards.

8 Claims, 25 Drawing Sheets

| CARD TYPE | C-plane | U-plane |
|---|---|---|
| CALL CONTROL CARD | RRC | - |
| L2-1 CARD | PDCP<br>RLC | PDCP<br>RLC |
| L2-2 CARD | MAC (Scheduling) | MAC (Scheduling) |
| L1 CARD | MAC (HARQ)<br>PHY | MAC (HARQ)<br>PHY |
| TRANSMISSION PATH 1 CARD | S1-AP<br>SCTP<br>IP | GTP-U<br>UDP<br>IP |
| TRANSMISSION PATH 2 CARD | CPRI | CPRI/ORI |

FIG.4

| PATH TYPE | LINK TYPE | INPUT | OUTPUT |
|---|---|---|---|
| FIRST CHANNEL | UL | L1 CARD | L1 CARD |
| | DL | L1 CARD | L1 CARD |
| SECOND CHANNEL | UL | L2-1 CARD | TRANSMISSION PATH 1 CARD |
| | DL | TRANSMISSION PATH 1 CARD | L2-1 CARD |
| THIRD CHANNEL | UL | - | - |
| | DL | - | - |

| CARD NUMBER | CARD TYPE | ADDRESS INFORMATION | DEPENDENCY | IN-USE FLAG |
|---|---|---|---|---|
| 1 | L1 CARD | 192.168.0.101 | 22 | 0 |
| 2 | L1 CARD | 192.168.0.102 | 23 | 0 |
| 3 | L1 CARD | 192.168.0.103 | 24 | 0 |
| 4 | L1 CARD | 192.168.0.104 | 25 | 0 |
| 5 | L1 CARD | 192.168.0.105 | 26 | 0 |
| 6 | L2-2 CARD | 192.168.0.106 | - | 0 |
| 7 | L2-2 CARD | 192.168.0.107 | - | 0 |
| 8 | L2-2 CARD | 192.168.0.108 | - | 0 |
| 9 | L2-2 CARD | 192.168.0.109 | - | 0 |
| 10 | L2-2 CARD | 192.168.0.110 | - | 0 |
| 11 | L2-2 CARD | 192.168.0.111 | - | 0 |
| 12 | L2-2 CARD | 192.168.0.112 | - | 0 |
| 13 | L2-2 CARD | 192.168.0.113 | - | 0 |
| 14 | TRANSMISSION PATH 1 CARD | 192.168.0.114 | - | 0 |
| 15 | TRANSMISSION PATH 1 CARD | 192.168.0.115 | - | 0 |
| 16 | L2-1 CARD | 192.168.0.116 | - | 0 |
| 17 | L2-1 CARD | 192.168.0.117 | - | 0 |
| 18 | L2-1 CARD | 192.168.0.118 | - | 0 |
| 19 | CALL CONTROL CARD | 192.168.0.119 | - | 0 |
| 20 | CALL CONTROL CARD | 192.168.0.120 | - | 0 |
| 21 | CALL CONTROL CARD (MAIN CALL CONTROL CARD) | 192.168.0.1 | - | 0 |
| 22 | TRANSMISSION PATH 2 CARD | 192.168.0.122 | 1 | 0 |
| 23 | TRANSMISSION PATH 2 CARD | 192.168.0.123 | 2 | 0 |
| 24 | TRANSMISSION PATH 2 CARD | 192.168.0.124 | 3 | 0 |
| 25 | TRANSMISSION PATH 2 CARD | 192.168.0.125 | 4 | 0 |
| 26 | TRANSMISSION PATH 2 CARD | 192.168.0.126 | 5 | 0 |

114

| PATH TYPE | LINK TYPE | INPUT | OUTPUT |
|---|---|---|---|
| FIRST CHANNEL | UL | L1 CARD | L1 CARD |
| | DL | L1 CARD | L1 CARD |
| SECOND CHANNEL | UL1 | L1 CARD | L1 CARD |
| | DL1 | L1 CARD | L1 CARD |
| | DL2 | L2-1 CARD | L1 CARD |
| THIRD CHANNEL | UL1 | L1 CARD | L1 CARD |
| | DL1 | L1 CARD | L1 CARD |
| | DL2 | L2-1 CARD | L1 CARD |

FIG.9

| PATH TYPE | LINK TYPE | INPUT | OUTPUT |
|---|---|---|---|
| FIRST CHANNEL | UL | - | - |
| | DL | - | - |
| SECOND CHANNEL | UL1 | L1 CARD | L2-2 CARD |
| | UL2 | L1 CARD | CALL CONTROL CARD |
| | DL1 | CALL CONTROL CARD | L1 CARD |
| | DL2 | CALL CONTROL CARD | L2-2 CARD |
| THIRD CHANNEL | UL1 | L1 CARD | L2-2 CARD |
| | UL2 | L1 CARD | TRANSMISSION PATH 1 CARD |
| | DL1 | L1 CARD | L2-2 CARD |
| | DL2 | L2-2 CARD | L1 CARD |

FIG.11

| PATH TYPE | LINK TYPE | INPUT | OUTPUT |
|---|---|---|---|
| FIRST CHANNEL | UL1 | TRANSMISSION PATH 2 CARD | CALL CONTROL CARD |
| | UL2 | TRANSMISSION PATH 2 CARD | L2-2 CARD |
| | DL1 | CALL CONTROL CARD | TRANSMISSION PATH 2 CARD |
| | DL2 | L2-2 CARD | TRANSMISSION PATH 2 CARD |
| SECOND CHANNEL | UL1 | TRANSMISSION PATH 2 CARD | L2-1 CARD |
| | UL2 | TRANSMISSION PATH 2 CARD | L2-2 CARD |
| | DL1 | L2-1 CARD | TRANSMISSION PATH 2 CARD |
| | DL2 | L2-2 CARD | TRANSMISSION PATH 2 CARD |
| THIRD CHANNEL | UL1 | TRANSMISSION PATH 2 CARD | L2-1 CARD |
| | UL2 | TRANSMISSION PATH 2 CARD | L2-2 CARD |
| | DL1 | L2-1 CARD | TRANSMISSION PATH 2 CARD |
| | DL2 | L2-2 CARD | TRANSMISSION PATH 2 CARD |

143

| PATH TYPE | LINK TYPE | INPUT | OUTPUT |
|---|---|---|---|
| FIRST CHANNEL | UL | - | - |
| | DL | - | - |
| SECOND CHANNEL | UL | (MME) | CALL CONTROL CARD |
| | DL | CALL CONTROL CARD | (MME) |
| THIRD CHANNEL | UL | (MME) | L2-1 CARD |
| | DL | L2-1 CARD | (MME) |

FIG.15

| CELL NUMBER | PATH TYPE | CARD NUMBER | CARD TYPE | ADDRESS INFORMATION |
|---|---|---|---|---|
| 1 | FIRST CHANNEL | 1 | L1 CARD | 192.168.0.101 |
| 1 | FIRST CHANNEL | 6 | L2-2 CARD | 192.168.0.106 |
| 1 | FIRST CHANNEL | 21 | CALL CONTROL CARD (MAIN CALL CONTROL CARD) | 192.168.0.1 |
| 1 | FIRST CHANNEL | 22 | TRANSMISSION PATH 2 CARD | 192.168.0.122 |

| CELL NUMBER | PATH TYPE | CARD NUMBER | CARD TYPE | ADDRESS INFORMATION |
|---|---|---|---|---|
| 1 | FIRST CHANNEL | 1 | L1 CARD | 192.168.0.101 |
| 1 | FIRST CHANNEL | 21 | CALL CONTROL CARD (MAIN CALL CONTROL CARD) | 192.168.0.1 |
| 1 | FIRST CHANNEL | 22 | TRANSMISSION PATH 2 CARD | 192.168.0.122 |

| CELL NUMBER | PATH TYPE | CARD NUMBER | CARD TYPE | ADDRESS INFORMATION |
|---|---|---|---|---|
| 1 | FIRST CHANNEL | 6 | L2-2 CARD | 192.168.0.106 |
| 1 | FIRST CHANNEL | 21 | CALL CONTROL CARD (MAIN CALL CONTROL CARD) | 192.168.0.1 |
| 1 | FIRST CHANNEL | 22 | TRANSMISSION PATH 2 CARD | 192.168.0.122 |

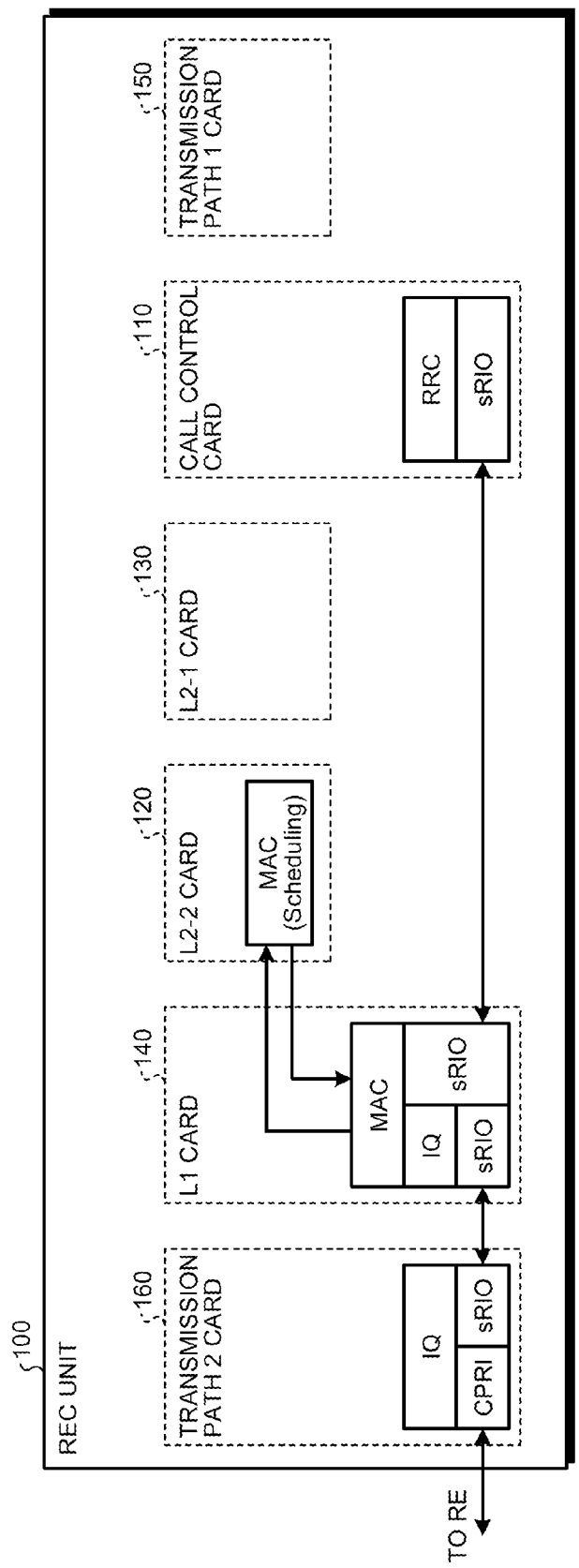

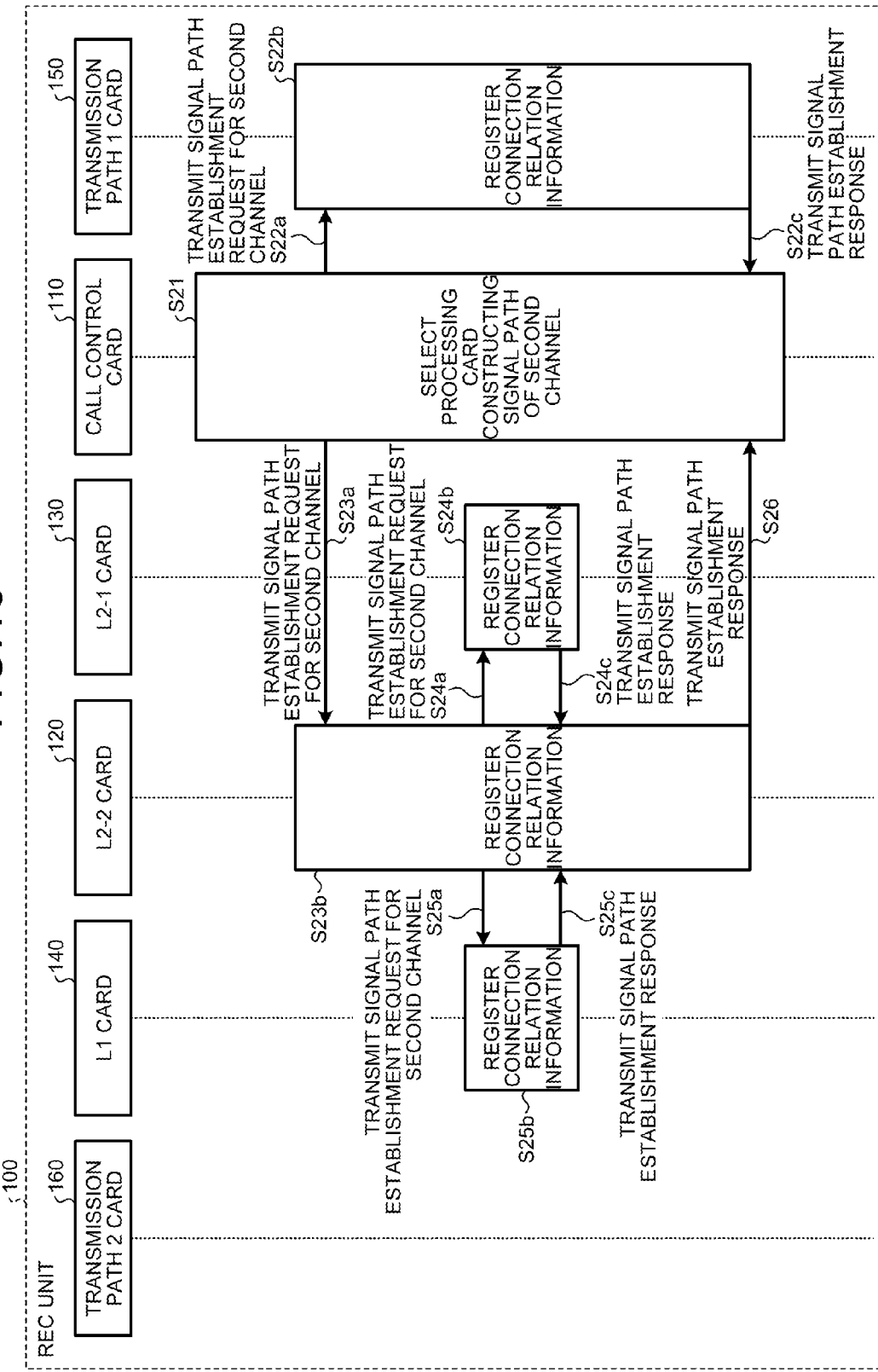

FIG.19

| CELL NUMBER | RESOURCE IDENTIFICATION INFORMATION | CARD NUMBER | CARD TYPE | ADDRESS INFORMATION |
|---|---|---|---|---|
| 1 | AA | 1 | L1 CARD | 192.168.0.101 |
| 1 | AA | 6 | L2-2 CARD | 192.168.0.106 |
| 1 | AA | 14 | TRANSMISSION PATH 1 CARD | 192.168.0.114 |
| 1 | AA | 16 | L2-1 CARD | 192.168.0.116 |
| 1 | AA | 21 | CALL CONTROL CARD (MAIN CALL CONTROL CARD) | 192.168.0.1 |
| 1 | AA | 22 | TRANSMISSION PATH 2 CARD | 192.168.0.122 |

| CELL NUMBER | RESOURCE IDENTIFICATION INFORMATION | PATH TYPE | CARD NUMBER | CARD TYPE | ADDRESS INFORMATION |
|---|---|---|---|---|---|
| 1 | AA | SECOND CHANNEL | 1 | L1 CARD | 192.168.0.101 |
| 1 | AA | SECOND CHANNEL | 14 | TRANSMISSION PATH 1 CARD | 192.168.0.114 |
| 1 | AA | SECOND CHANNEL | 16 | L2-1 CARD | 192.168.0.116 |
| 1 | AA | SECOND CHANNEL | 21 | CALL CONTROL CARD (MAIN CALL CONTROL CARD) | 192.168.0.1 |
| 1 | AA | SECOND CHANNEL | 22 | TRANSMISSION PATH 2 CARD | 192.168.0.122 |

| CELL NUMBER | RESOURCE IDENTIFICATION INFORMATION | PATH TYPE | CARD NUMBER | CARD TYPE | ADDRESS INFORMATION |
|---|---|---|---|---|---|
| 1 | AA | SECOND CHANNEL | 1 | L1 CARD | 192.168.0.101 |
| 1 | AA | SECOND CHANNEL | 6 | L2-2 CARD | 192.168.0.106 |
| 1 | AA | SECOND CHANNEL | 21 | CALL CONTROL CARD (MAIN CALL CONTROL CARD) | 192.168.0.1 |

FIG.20C

| CELL NUMBER | RESOURCE IDENTIFICATION INFORMATION | PATH TYPE | CARD NUMBER | CARD TYPE | ADDRESS INFORMATION |
|---|---|---|---|---|---|
| 1 | AA | SECOND CHANNEL | 6 | L2-2 CARD | 192.168.0.106 |
| 1 | AA | SECOND CHANNEL | 16 | L2-1 CARD | 192.168.0.116 |
| 1 | AA | SECOND CHANNEL | 22 | TRANSMISSION PATH 2 CARD | 192.168.0.122 |

| CELL NUMBER | RESOURCE IDENTIFICATION INFORMATION | PATH TYPE | CARD NUMBER | CARD TYPE | ADDRESS INFORMATION |
|---|---|---|---|---|---|
| 1 | AA | SECOND CHANNEL | 21 | CALL CONTROL CARD (MAIN CALL CONTROL CARD) | 192.168.0.1 |

152

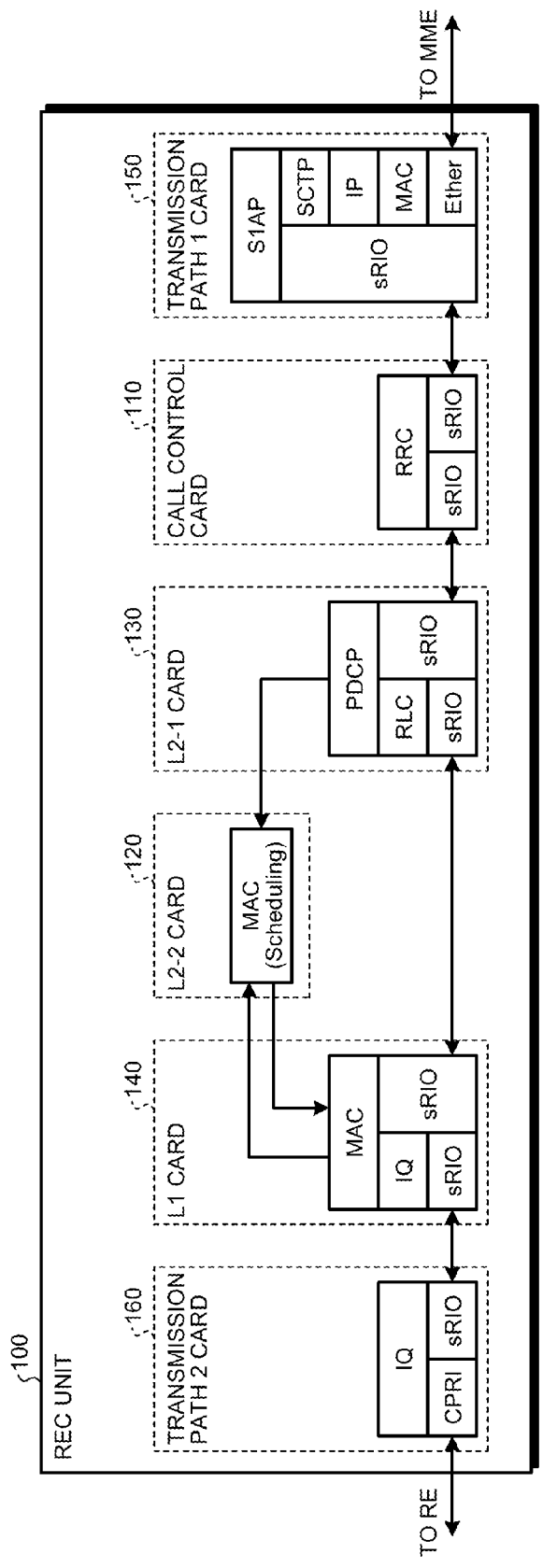

FIG.23

| CELL NUMBER | RESOURCE IDENTIFICATION INFORMATION | CARD NUMBER | CARD TYPE | ADDRESS INFORMATION |
|---|---|---|---|---|
| 1 | AA | 1 | L1 CARD | 192.168.0.101 |
| 1 | AA | 6 | L2-2 CARD | 192.168.0.106 |
| 1 | AA | 14 | TRANSMISSION PATH 1 CARD | 192.168.0.114 |
| 1 | AA | 16 | L2-1 CARD | 192.168.0.116 |
| 1 | AA | 22 | TRANSMISSION PATH 2 CARD | 192.168.0.122 |

| CELL NUMBER | RESOURCE IDENTIFICATION INFORMATION | PATH TYPE | CARD NUMBER | CARD TYPE | ADDRESS INFORMATION |
|---|---|---|---|---|---|
| 1 | AA | THIRD CHANNEL | 1 | L1 CARD | 192.168.0.101 |
| 1 | AA | THIRD CHANNEL | 14 | TRANSMISSION PATH 1 CARD | 192.168.0.114 |
| 1 | AA | THIRD CHANNEL | 16 | L2-1 CARD | 192.168.0.116 |
| 1 | AA | THIRD CHANNEL | 22 | TRANSMISSION PATH 2 CARD | 192.168.0.122 |

| CELL NUMBER | RESOURCE IDENTIFICATION INFORMATION | PATH TYPE | CARD NUMBER | CARD TYPE | ADDRESS INFORMATION |
|---|---|---|---|---|---|
| 1 | AA | THIRD CHANNEL | 1 | L1 CARD | 192.168.0.101 |
| 1 | AA | THIRD CHANNEL | 6 | L2-2 CARD | 192.168.0.106 |
| 1 | AA | THIRD CHANNEL | 14 | TRANSMISSION PATH 1 CARD | 192.168.0.114 |

FIG.24C

| CELL NUMBER | RESOURCE IDENTIFICATION INFORMATION | PATH TYPE | CARD NUMBER | CARD TYPE | ADDRESS INFORMATION |
|---|---|---|---|---|---|
| 1 | AA | THIRD CHANNEL | 6 | L2-2 CARD | 192.168.0.106 |
| 1 | AA | THIRD CHANNEL | 16 | L2-1 CARD | 192.168.0.116 |
| 1 | AA | THIRD CHANNEL | 22 | TRANSMISSION PATH 2 CARD | 192.168.0.122 |

| CELL NUMBER | RESOURCE IDENTIFICATION INFORMATION | PATH TYPE | CARD NUMBER | CARD TYPE | ADDRESS INFORMATION |
|---|---|---|---|---|---|
| 1 | AA | THIRD CHANNEL | 21 | CALL CONTROL CARD (MAIN CALL CONTROL CARD) | 192.168.0.1 |

152

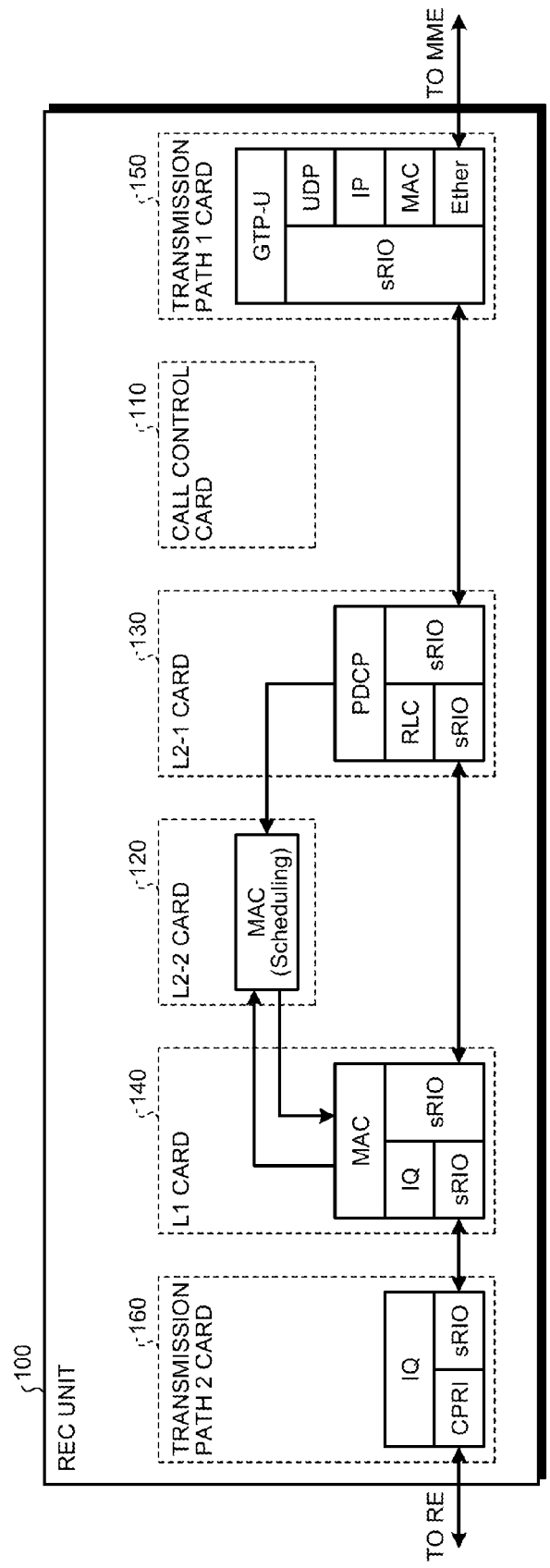

FIG.26

| CELL NUMBER | RESOURCE IDENTIFICATION INFORMATION | PATH TYPE | CARD NUMBER | CARD TYPE | ADDRESS INFORMATION |
|---|---|---|---|---|---|
| 1 | - | FIRST CHANNEL | 6 | L2-2 CARD | 192.168.0.106 |
| 1 | - | FIRST CHANNEL | 21 | CALL CONTROL CARD (MAIN CALL CONTROL CARD) | 192.168.0.1 |
| 1 | - | FIRST CHANNEL | 22 | TRANSMISSION PATH 2 CARD | 192.168.0.122 |
| 1 | AA | SECOND CHANNEL | 6 | L2-2 CARD | 192.168.0.106 |
| 1 | AA | SECOND CHANNEL | 16 | L2-1 CARD | 192.168.0.116 |
| 1 | AA | SECOND CHANNEL | 22 | TRANSMISSION PATH 2 CARD | 192.168.0.122 |
| 1 | AA | THIRD CHANNEL | 6 | L2-2 CARD | 192.168.0.106 |
| 1 | AA | THIRD CHANNEL | 16 | L2-1 CARD | 192.168.0.116 |
| 1 | AA | THIRD CHANNEL | 22 | TRANSMISSION PATH 2 CARD | 192.168.0.122 |

142

BASE STATION APPARATUS

CROSS-REFERENCE TO RELATED APPLICATION

This application is based upon and claims the benefit of priority of the prior Japanese Patent Application No. 2014-233040, filed on Nov. 17, 2014, the entire contents of which are incorporated herein by reference.

FIELD

The embodiment discussed herein is directed to a base station apparatus.

BACKGROUND

Traffic in a mobile communication network has been increasing explosively in recent years as a mobile communication device, notably a smart phone and a tablet terminal, and an application service provided by mobile communication using the mobile communication device have become rapidly widespread. While a mobile communication carrier has started to shift from a 3G (3rd Generation) service to an LTE (Long Term Evolution: registered trademark) service in order to meet the rapidly increasing traffic, it is desired to take further measures against the traffic.

Now, there has been proposed a technique in which, for example, a base station apparatus including a plurality of processing cards corresponding to each area relocates a radio channel of a processing card for which a problem is detected to a processing card covering another area, the plurality of processing cards performing baseband processing on a radio signal transmitted to/from a mobile unit. Moreover, there has been proposed a technique in which, for example, a radio base station including a plurality of processing cards operates an appropriate number of processing cards while adapting to future traffic predicted, the plurality of processing cards performing baseband processing on a transmission/reception signal transmitted to/from a plurality of mobile terminals.

Patent Literature 1: Japanese Laid-open Patent Publication No. 2009-38692
Patent Literature 2: Japanese Laid-open Patent Publication No. 2012-85155

However, the aforementioned technique of the related art lumps together a plurality of functions executing a series of processing on a baseband signal and implements it into one processing card. The processing performed on the baseband signal includes RLC (Radio Link Control) processing defined by a 3GPP (3rd Generation Partnership Project: registered trademark), MAC (Media Access Control) processing, and encoding processing. In order to meet the rapidly increasing traffic, the aforementioned technique of the related art accommodates in one base station apparatus the processing cards, the number of which corresponds to the number of radio resources such as cells or sectors accommodated in a base station or the number of user terminals accommodated in the radio resource.

Accordingly, the aforementioned technique of the related art expands or removes a function according to the traffic per processing card in which the plurality of functions executing the series of processing on the baseband signal is implemented in a lump. The aforementioned technique of the related art therefore has a problem that a hardware resource is assigned excessively depending on the traffic for each radio resource such as the cell or sector when seen by the unit of function, and that use efficiency of the processing card is decreased.

SUMMARY

In one aspect, the base station apparatus includes a management unit, a selection unit, and a transmission unit. The management unit manages card information on one or more first processing cards, one or more second processing cards, and one or more third processing cards in which a scheduling function for communication processing performed with respect to the first processing card and/or the second processing card is implemented. A communication layer handling a physical channel is implemented in the first processing card. A communication layer handling a logical channel is implemented in the second processing card. The selection unit selects a processing card establishing a signal path relevant to the logical channel from among the first processing card, the second processing card, and the third processing card, the card information on each of which is managed by the management unit. The transmission unit transmits connection relation information indicating a combination of the processing cards selected by the selection unit to each processing card included in the connection relation information. On the basis of the connection relation information received from the transmission unit, each processing card establishes the signal path relevant to the logical channel between each of the processing cards.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a connection template table included in the call control card;

FIG. 5 illustrates an example of a card information table included in the call control card;

FIG. 9 illustrates an example of a connection template table included in the L2-1 card;

FIG. 11 illustrates an example of a connection template table included in the L1 card;

FIG. 15 is a table illustrating an example of connection relation information included in a signal path establishment request for the first channel;

FIG. 16A illustrates an example of a connection relation information table relevant to a signal path for the first channel registered in the L2-2 card;

FIG. 16B illustrates an example of the connection relation information table relevant to the signal path for the first channel registered in the L1 card;

FIG. 17 is a block diagram illustrating an example of a signal path established by the signal path establishment processing for the first channel;

FIG. 18 is a sequence diagram illustrating an example of signal path establishment processing for a second channel;

FIG. 19 is a table illustrating an example of connection relation information included in a signal path establishment request for the second channel;

FIG. 20A illustrates an example of a connection relation information table relevant to a signal path for the second channel registered in the L2-2 card;

FIG. 20B illustrates an example of the connection relation information table relevant to the signal path for the second channel registered in the L2-1 card;

FIG. 20C illustrates an example of the connection relation information table relevant to the signal path for the second channel registered in the L1 card;

FIG. 20D illustrates an example of the connection relation information table relevant to the signal path for the second channel registered in the transmission path 1 card;

FIG. 21 is a block diagram illustrating an example of a signal path established by the signal path establishment processing for the second channel;

FIG. 23 is a table illustrating an example of connection relation information included in a signal path establishment request for the third channel;

FIG. 24A illustrates an example of a connection relation information table relevant to a signal path for the third channel registered in the L2-2 card;

FIG. 24B illustrates an example of the connection relation information table relevant to the signal path for the third channel registered in the L2-1 card;

FIG. 24C illustrates an example of the connection relation information table relevant to the signal path for the third channel registered in the L1 card;

FIG. 24D illustrates an example of the connection relation information table relevant to the signal path for the third channel registered in the transmission path 1 card;

FIG. 25 is a block diagram illustrating an example of a signal path established by path establishment processing for the third channel; and FIG. 26 illustrates an example of a connection relation information table of the L1 card in which each connection relation information relevant to the signal path of each of the first to third channels is registered.

DESCRIPTION OF EMBODIMENTS

Preferred embodiments of the present invention will be explained with reference to accompanying drawings. Note that the technique disclosed is not to be limited by the following embodiments. Each of the embodiments can also be combined as appropriate within the range not causing contradiction in the details of processing.

Embodiments

Configuration of REC Unit

Figure 1:
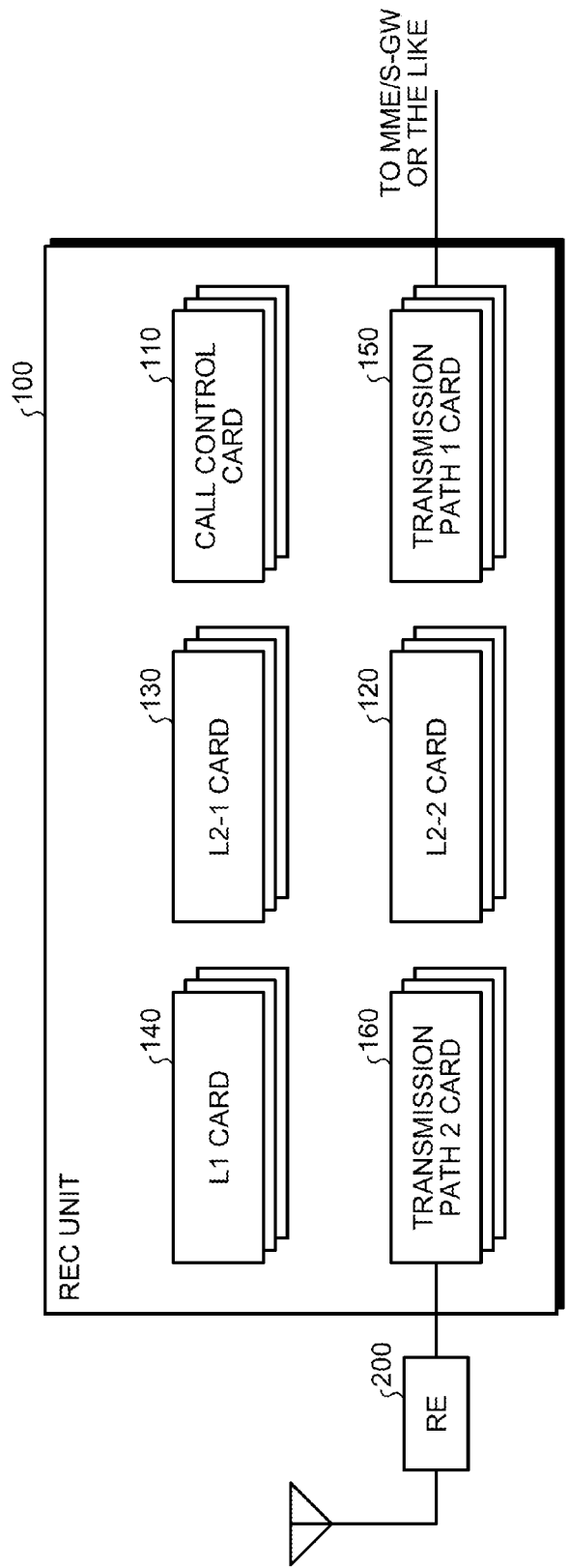
FIG. 1 is a block diagram illustrating an example of a configuration of an REC unit.

FIG. 1 is a block diagram illustrating an example of a configuration of an REC unit. The configuration of the REC unit is illustrated merely as an example in FIG. 1 and is not limited thereto. The REC (Radio Equipment Control) unit corresponds to a radio communication processing unit of a radio signal processing unit and a radio unit that are separated in a radio base station of a mobile communication system and connected by an optical fiber or the like. The REC unit is also referred to as a BDE (Base station Digital processing Equipment) unit.

An REC unit 100 is connected to RE (Radio Equipment) having a radio antenna and an MME (Mobile Management Entity)/S-GW (Serving-GateWay). The REC unit 100 includes a call control card 110, an L2-2 card 120, an L2-1 card 130, an L1 card 140, a transmission path 1 card 150, and a transmission path 2 card 160. The REC unit 100 accommodates one or more of each of the call control card 110, the L2-2 card 120, the L2-1 card 130, the L1 card 140, the transmission path 1 card 150, and the transmission path 2 card 160. Each of the call control card 110, the L2-2 card 120, the L2-1 card 130, the L1 card 140, the transmission path 1 card 150, and the transmission path 2 card 160 is a processing card to which a different function is implemented.

The call control card 110, the L2-2 card 120, the L2-1 card 130, the L1 card 140, the transmission path 1 card 150 and the transmission path 2 card 160 are connected to one another via a bus switch (such as a sRIO (serial Rapid IO) switch) that is not illustrated, for example.

The REC unit 100 can accommodate a plurality of each processing card. The REC unit 100 can accommodate a plurality of the call control card 110 as well. When accommodating the plurality of the call control cards 110, the REC unit 100 sets one of the call control cards 110 to be a main call control card serving as the master and sets each of the call control cards 110 other than the main call control card to be another call control card serving as the slave. The main call control card and the other call control card have the same functional configuration except that the cards are in a master-slave relationship.

The call control card 110 set as the main call control card has functions of the call control card and controls the other call control card to balance the load of call control processing. The call control card 110 set as the other call control card executes the call control processing under control of the main call control card. Call processing control (such as RRC (Radio Resource Control)) including setting/releasing of a line is implemented in the call control card 110. Also implemented in the call control card 110 is a management function for information relevant to each of the call control card 110 to the transmission path 2 card 160 accommodated in the REC unit 100.

Implemented in the L2-2 card 120 is processing relevant to scheduling of a signal path based on information on the signal path (such as an amount of signal delay on the signal path). The L2-2 card 120 for example performs priority control in mapping (allocating) a signal to a physical resource (radio resource) executed in the L1 card 140.

Implemented in the L2-1 card 130 is processing relevant to an L2 (Layer 2) for a layer higher than or equal to a logical channel (such as processing relevant to a PDCP (Packet Data Convergence Protocol) layer and an RLC (Radio Link Control) layer). The L2-1 card 130 for example provides a call (bearer) service to a processing card higher than the L2-1 card 130 (such as the call control card 110) in a communication layer.

Implemented in the L1 card 140 is processing relevant to a physical channel and a transport channel (such as processing relevant to an MAC (Media Access Control) layer and a physical layer). The L1 card 140 for example provides a logical hierarchy independent of a radio resource (such as a cell) to a processing card higher than the L1 card 140 (such as the L2-1 card 130) in the communication layer.

The transmission path 1 card 150 has a function that communicates with a node on a core network and another base station apparatus. The transmission path 2 card 160 has a function that transmits/receives a radio signal (an IQ (In-phase/Quadrature) signal) to/from a radio unit according to a transmission path interface standard such as a CPRI and an ORI. Note that the node on the core network is the MME and the S-GW, for example. The CPRI stands for a Common Public Radio Interface, while the ORI stands for an Open Radio Interface. The radio unit is RE (Radio Equipment) 200, for example.

The REC unit 100 may also be configured to include the call control card 110, the transmission path 1 card 150, and the transmission path 2 card 160 and be able to add the L2-2 card 120, the L2-1 card, and the L1 card 140 as appropriate.

Figures 2, 3:
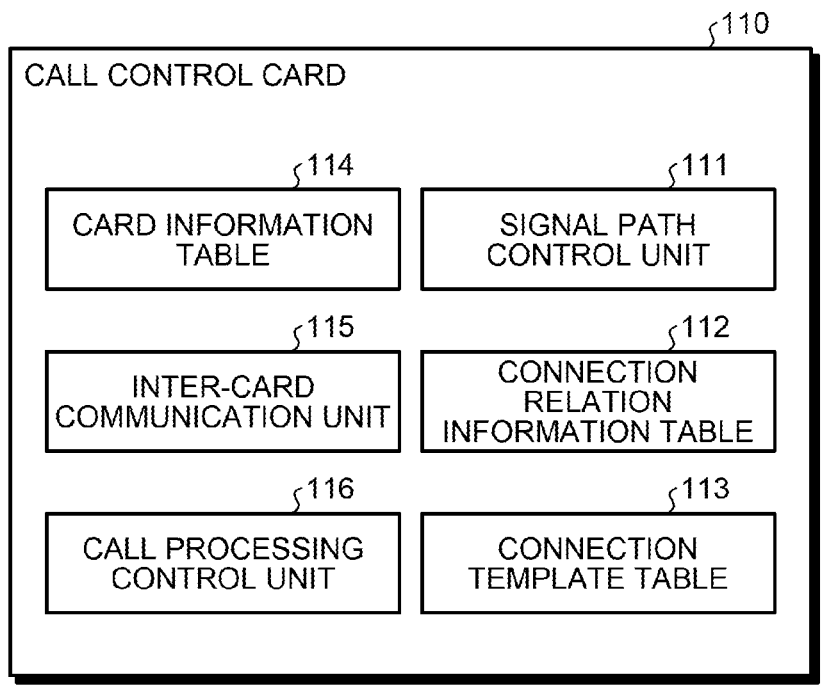
FIG. 2 is a table illustrating an example of correspondence between each processing card and a protocol stack for communication processing.
FIG. 3 is a block diagram illustrating an example of a configuration of a call control card.

Correspondence Between Each Processing Card and Protocol Stack for Communication Processing FIG. 2 is a table illustrating an example of correspondence between each processing card and a protocol stack for communication processing. FIG. 2 merely illustrates an example of the correspondence between each processing card and the protocol stack for communication processing, where the correspondence is not limited to what is illustrated.

A C-plane (Control-plane) being a second channel that executes signal path control or the like is a DCCH (Dedicated Control Channel), for example. That is, the second channel is used when transmitting/receiving a control signal or the like to/from a mobile station accommodated in the REC unit 100. A U-plane (User-plane) being a third channel that executes user data processing is a DTCH (Dedicated Traffic CHannel). A first channel to be described is a logical channel such as a CCCH (Common Control CHannel) or a BCCH (Broadcasting Control CHannel) in the embodiment.

The first channel is established when setting a cell after a base station and the corresponding REC unit 100 are started up, for example. The first channel is the CCCH, for example. The second channel is established in response to a connection request of the RRC from the base station and a mobile station accommodated in the corresponding REC unit 100, for example. The second channel is the DCCH, for example. The third channel is established in response to a NAS (Non Access Stratum) message (such as an Activate Request or an Activate Default EPSBearer Context Request) from the MME, for example. The third channel is the DTCH, for example.

An RRC layer is implemented in the C-plane of the call control card 110, for example. A PDCP layer and an RLC layer are implemented in each of the C-plane and the U-plane of the L2-1 card 130. A MAC (Scheduling) (Media Access Control Scheduling) layer is implemented in each of the C-plane and the U-plane of the L2-2 card 120. A MAC (HARQ) (Media Access Control Hybrid Automatic Repeat reQuest) layer and a PHY (PHYsical) layer are implemented in each of the C-plane and the U-plane of the L1 card 140.

An S1-AP (S1-Application Protocol) layer, an SCTP (Stream Control Transmission Protocol) layer and an IP (Internet Protocol) layer are implemented in the C-plane of the transmission path 1 card 150. Moreover, a GTP-U (Gprs (General packet radio service) Tunneling Protocol User plane) layer, a UDP (User Datagram Protocol) layer and the IP (Internet Protocol) layer are implemented in the U-plane of the transmission path 1 card. A CPRI layer is implemented in the C-plane of the transmission path 2 card 160. Moreover, a CPRI/ORI layer is implemented in the U-plane of the transmission path 2 card 160.

Configuration of Call Control Card

FIG. 3 is a block diagram illustrating an example of a configuration of the call control card. The configuration of the call control card is illustrated merely as an example in FIG. 3 and is not limited thereto. The call control card 110 includes a signal path control unit 111, a connection relation information table 112, a connection template table 113, a card information table 114, an inter-card communication unit 115, and a call processing control unit 116.

The signal path control unit 111 receives, through the inter-card communication unit 115, a notification of card information on each processing card from the L2-2 card 120, the L2-1 card 130, the L1 card 140, the transmission path 1 card 150, and the transmission path 2 card 160. The card information on each processing card includes a "card type" of each processing card. The call control card 110 set as the main call control card receives the "card type" of the other call control card therefrom. The signal path control unit 111 then registers the card information received from each processing card into the card information table 114.

When the call control card is the main call control card, the signal path control unit 111 thereof receives a notification of the card information from the other call control card and registers the card information into the card information table 114. Moreover, when the call control card is the main call control card, the signal path control unit 111 thereof registers card information of its own card into the card information table 114.

The signal path control unit 111 further selects from the processing cards, the card information of which is registered in the card information table 114, a processing card constructing the signal path of each of the first to third channels for each cell accommodated in the REC unit 100. The signal path control unit 111 for example selects the type of the processing card constructing the signal path and the count of each type autonomously according to the type of each of the first to third channels for which the signal path is to be constructed, the number of users accommodated in the cell, and the traffic in the cell. The call control card 110 for example selects, as information relevant to the processing card constructing the signal path of each of the first to third channels, one or more pieces of card information for each type from the card information of the "card type" including the "call control card", the "L2-2 card", the "L1 card", and the "transmission path 2 card". Alternatively, the signal path control unit 111 may select the type of the processing card constructing the signal path and the count of each type according to input from a terminal not illustrated, for example.

The signal path control unit 111 then merges the card information in the card information table 114 corresponding to each processing card selected to construct the signal path for each of the first to third channels for each cell, and generates connection relation information. Then, the signal path control unit 111 registers the generated connection relation information into the connection relation information table 112. Details of the connection relation information table 112 will be described later on.

When the connection relation information registered in the connection relation information table 112 includes its own card, the signal path control unit 111 establishes the signal path between the own card and a processing card having input/output relation therewith for each channel, on the basis of the connection template table 113.

When the connection relation information registered in the connection relation information table 112 includes its own card, the signal path control unit 111 for example executes the following processing according to a template of the connection relation between the own card and each processing card defined in the connection template table 113. That is, the signal path control unit 111 recognizes a processing card having the connection relation with the own card, from among the processing cards included in the connection relation information. Note that the template of the connection relation of each processing card is a model representing, for each channel, the other processing card that has the input/output relation with the own card. Details of the connection template table 113 will be described later on.

The signal path control unit 111 then transmits, through the inter-card communication unit 115, a signal path establishment request including the connection relation information registered in the connection relation information table 112 to the L2-2 card 120, for example, that has connection relation with the own card in the connection template table 113. The signal path control unit 111 then receives, through the inter-card communication unit 115, a signal path establishment response from the L2-2 card 120 or the like to which the path establishment request is transmitted, the response indicating that the signal path is established among all processing cards except the transmission path 1 card 150 included in the connection relation information. The call control card 110 thus establishes the signal path of each of the first to third channels between the processing cards included in the connection relation information that is registered in the connection relation information table 112.

Moreover, the signal path control unit 111 transmits, to the transmission path 1 card 150, a request to establish an S1 communication link with the MME through the inter-card communication unit 115. The transmission path 1 card 150 establishes an S1 communication link with the MME upon receiving the request to establish the S1 communication link from the signal path control unit 111 through the inter-card communication unit 115. The signal path control unit 111 then transmits, through the inter-card communication unit 115, a transmission/reception start request of a channel to each processing card for which the signal path is established in response to the signal path establishment request.

After that, the call processing control unit 116 executes, through the inter-card communication unit 115, call control relevant to communication that is performed via the signal path established between the processing cards. The signal path control unit 111 executes, for all cells accommodated in the REC unit 100, a series of processing and processing to establish the S1 communication link with the MME, the series of processing including selection of the processing card constructing the signal path of the channel for each cell up to establishment of the signal path among all processing cards included in the connection relation information.

Connection Template Table Included in Call Control Card

FIG. 4 illustrates an example of the connection template table included in the call control card. FIG. 4 merely illustrates an example of the connection template table included in the call control card, where the information in the table is not limited to what is illustrated. The connection template table 113 included in the call control card 110 is a piece of information referenced when the signal path control unit 111 constructs a signal path of a channel on the basis of the connection relation information generated.

The connection template table 113 includes columns corresponding to a "path type", a "link type", "input" and "output". The "path type" distinguishes the "first channel", the "second channel" and the "third channel". The "link type" distinguishes a "UL" (UpLink) and a "DL" (DownLink). The "input" indicates the "card type" of the processing card being the input source that is channel-connected to the "input" side of the call control card 110 for each "link type". The "output" indicates the "card type" of the processing card being the output destination that is channel-connected to the "output" side of the call control card 110.

Concerning the signal path of the channel with the "path type" being the "first channel" and the "link type" being the "UL", for example, the "L1 card" is the "input" to the call control card 110 while the "L1 card" is the "output" from the call control card 110. The "L1 card" is the "input" to the call control card 110 while the "L1 card" is the "output" from the call control card 110 concerning the signal path of the channel with the "path type" being the "first channel" and the "link type" being the "DL", for example.

Moreover, the "L2-1 card" is the "input" to the call control card 110 while the "transmission path 1 card" is the "output" from the call control card 110 concerning the signal path of the channel with the "path type" being the "second channel" and the "link type" being the "UL". The "transmission path 1 card" is the "input" to the call control card 110 while the "L2-1 card" is the "output" from the call control card 110 concerning the signal path of the channel with the "path type" being the "second channel" and the "link type" being the "DL", for example.

Moreover, the "input" and "output" to/from the call control card 110 are both "-" concerning the signal path of the channel with the "path type" being the "third channel" and the "link type" being the "UL". That is, the signal path of the "path type" being the "third channel" is constructed without including the call control card 110.

Card Information Table Included in Call Control Card

FIG. 5 illustrates an example of the card information table included in the call control card. FIG. 5 merely illustrates an example of the card information table of each processing card, where the information in the table is not limited to what is illustrated. The card information table 114 included in the call control card 110 is generated on the basis of card information notified to the call control card 110 from each processing card accommodated in the REC unit 100 that accommodates the call control card 110.

Note that the card information notified from each processing card to the call control card 110 may contain at least the "card type". The call control card 110 may, for example, identify which processing card accommodated in a card slot associated with which card number transmits the card information from the signal path through which the card information from each processing card is notified. In this case, the "card number" can be acquired independently of the description of the card information when receiving the notification of the card information, so that each processing card need not include the "card number" in the card information notified to the call control card 110.

The call control card 110 registers the card information received from each processing card into the card information table 114 and then configures "address information" to each processing card on the basis of an operation or the like by an operator. The call control card 110 registers the "address information" as illustrated in FIG. 5 into the card information table 114. Note that it may be configured to pre-install into each processing card a list of correspondence between the "card number" and the "address information" or a list of correspondence among the "card number", the "address information", and "dependency". In this case, the card information notified from each processing card to the call control card 110 is a combination of the "card number", the "card type" and the "address information" or a combination of the "card number", the "card type", the "address information", and the "dependency".

The card information table 114 includes columns corresponding to the "card number", the "card type", the "address information", the "dependency", and an "in-use flag". The "card number" is a number associated with a card slot that is used when each processing card is accommodated into the REC unit 100, for example. The "card type" indicates the type of a processing card in a corresponding entry. The "address information" is an IP (Internet Protocol) address, for example. The "address information" may be a piece of information with which each processing card in the REC unit 100 can be identified, and may be a piece of identification information such as another address, not necessarily the IP address.

The "dependency" indicates dependency that is determined in advance according to the implementation of the card slot associated with the "card number". The example illustrated in FIG. 5 indicates that the "L1 card" accommodated in the card slot of the "card number" corresponding to "1" is associated one-to-one with the "transmission path 2 card" accommodated in the card slot of the "card number" corresponding to "22". Note that a processing card corresponding to the "card number" for which "-" is indicated as the "dependency" indicates that the processing card has no dependency with a processing card accommodated in another card slot.

The "in-use flag" is a flag indicating whether or not a processing card of a corresponding entry is in use, namely whether or not the processing card is incorporated in the signal path of the channel being established. A value "0" for the "in-use flag" indicates that the processing card in the entry is not in use, while a value "1" for the "in-use flag" indicates that the processing card in the entry is in use.

The example illustrated in FIG. 5 indicates that five "L1 cards", eight "L2-2 cards", and two "transmission path 1 cards" are registered as the processing cards under the column "card type" in the card information table 114. Moreover, the example illustrated in FIG. 5 indicates that three "L2-1 cards", three "call control cards", and five "transmission path 2 cards" are registered as the processing cards under the column "card type" in the card information table 114.

Note that in FIG. 5, the "call control card" under the column "card type" with the "card number" corresponding to "21" is the main call control card. The "call control card" under the column "card type" with the "card number" corresponding to each of "19" and "20" is a call control card functioning as the slave with respect to the main call control card being the master.

When selecting a processing card constructing the signal path of the channel for each cell, the call control card 110 selects a processing card with the "in-use flag" set to "0", or a processing card that is not in use. In selecting the processing card, the call control card 110 first selects the L1 card 140 according to the type of each of the first to third channels for which the signal path is to be constructed, the number of users accommodated in the cell, and the traffic in the cell. After that, the call control card 110 selects the transmission path 2 card 160 identified by the "dependency" according to the type of each of the first to third channels for which the signal path is to be constructed, the number of users accommodated in the cell, and the traffic in the cell.

The call control card 110 then selects the L2-2 card 120, the L2-1 card 130, and the transmission path 1 card 150 according to the type of each of the first to third channels for which the signal path is to be constructed, the number of users accommodated in the cell, and the traffic in the cell. The call control card 110 then sets "1" for the "in-use flag" of the entry corresponding to the processing card being selected. The call control card 110 frees the processing card corresponding to the entry for which "1" is set as the "in-use flag" from the signal path of the channel being established, and then sets the "in-use flag" to "0".

[Configuration of L2-2 Card]

Figures 6, 7:
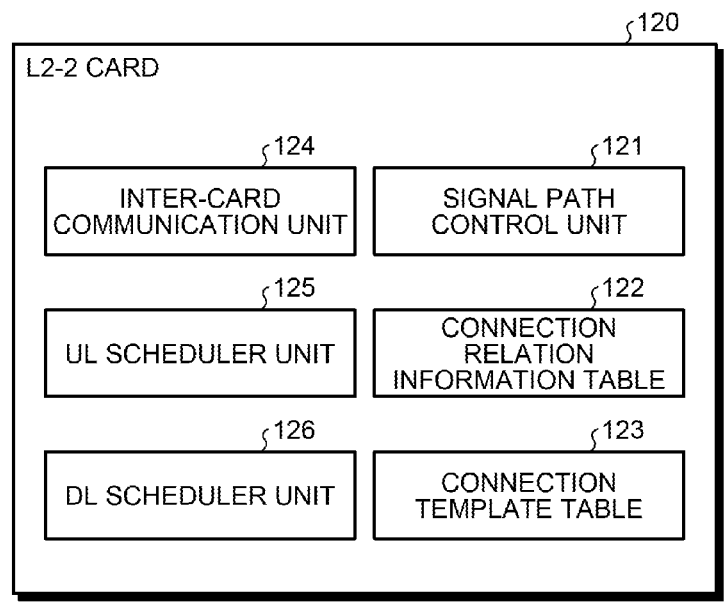
FIG. 6 is a block diagram illustrating an example of a configuration of an L2-2 card.
FIG. 7 illustrates an example of a connection template table included in the L2-2 card.

FIG. 6 is a block diagram illustrating an example of a configuration of the L2-2 card. The configuration of the L2-2 card is illustrated merely as an example in FIG. 6 and is not limited thereto. The L2-2 card 120 includes a signal path control unit 121, a connection relation information table 122, a connection template table 123, an inter-card communication unit 124, a UL (Up Link) scheduler unit 125, and a DL (Down Link) scheduler unit 126.

The signal path control unit 121 receives a signal path establishment request for each of the first to third channels including the connection relation information from the call control card 110 or the like through the inter-card communication unit 124. The signal path control unit 121 then determines whether or not its own card is included in the connection relation information that is included in the signal path establishment request being received. The signal path control unit 121 executes the following processing when the own card is included in the connection relation information that is included in the signal path establishment request being received.

That is, the signal path control unit 121 extracts, from the connection relation information included in the signal path establishment request being received, an entry of the "card type" matching the "input" and "output" of the connection template table 123 as well as an entry including the "transmission path 1 card" and the "transmission path 2 card". Then, the signal path control unit 121 registers the extracted connection relation information into the connection relation information table 122. Details of the connection relation information table 122 will be described later with reference to FIGS. 16A, 20A, and 24A. Details of the connection template table 123 will be described later with reference to FIG. 7.

The signal path control unit 121 then transmits, through the inter-card communication unit 124, the signal path establishment request including the connection relation information registered in the connection relation information table 122 to the L2-1 card 130 and/or the L1 card 140. Here, the L2-1 card 130 and/or the L1 card 140 are/is the processing card (s) for which connection relation with the own card is defined in the connection template table 123. Details of the connection template table 123 will be described later on.

The signal path control unit 121 then receives, through the inter-card communication unit 124, a signal path establishment response from the L2-1 card 130 and/or the L1 card 140 from which the connection relation information is transmitted, the response indicating that the signal path is established among all processing cards included in the connection relation information being transmitted. The L2-2 card 120 thus establishes the signal path of each of the first to third channels among all processing cards included in the connection relation information that is registered in the connection relation information table 122.

After that, each of the UL scheduler unit 125 and the DL scheduler unit 126 executes scheduling for each of upload link and download link performed via the signal path established between the processing cards through the inter-card communication unit 124.

Connection Template Table Included in L2-2 Card

FIG. 7 illustrates an example of the connection template table included in the L2-2 card. FIG. 7 merely illustrates an example of the connection template table included in the L2-2 card, where the information in the table is not limited to what is illustrated. The connection template table 123 included in the L2-2 card 120 is a piece of information referenced when the signal path control unit 121 constructs a signal path of a channel on the basis of the connection relation information received from the call control card 110. The configuration of the connection template table 123 is similar to the configuration of the connection template table 113 included in the call control card 110.

Concerning the signal path of the channel with the "path type" being the "first channel" and the "link type" being the "UL" and "DL", for example, the "input" and "output" to/from the L2-2 card 120 are both set to the "L1 card". Moreover, the "input" and "output" to/from the L2-2 card 120 are both set to the "L1 card" concerning the signal path of the channel with the "path type" being the "second channel" and the "link type" being a "UL1" and a "DL1". The "L2-1 card" is the "input" to the L2-2 card 120 while the "L1 card" is the "output" from the L2-2 card 120 concerning the signal path of the channel with the "path type" being the "second channel" and the "link type" being a "DL2", for example. Note that a signal path of the upload link corresponding to the "path type" being the "second channel" and the "link type" being the "DL2" is not defined.

Moreover, the "input" and "output" to/from the L2-2 card 120 are both set to the "L1 card" concerning the signal path of the channel with the "path type" being the "third channel" and the "link type" being the "UL1" and "DL1". The "L2-1 card" is the "input" to the L2-2 card 120 while the "L1 card" is the "output" from the L2-2 card 120 concerning the signal path of the channel with the "path type" being the "third channel" and the "link type" being the "DL2", for example. Note that a signal path of the upload link corresponding to the "path type" being the "third channel" and the "link type" being the "DL2" is not defined.

Configuration of L2-1 Card

Figure 8:
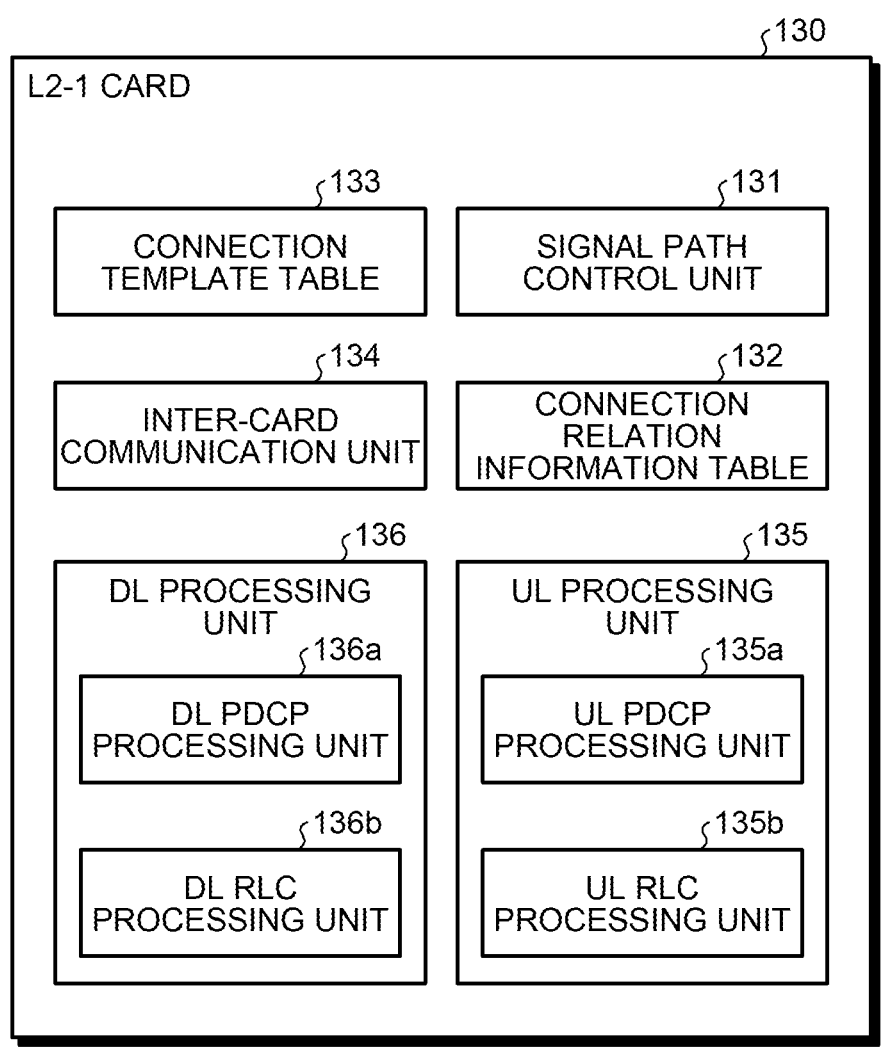
FIG. 8 is a block diagram illustrating an example of a configuration of an L2-1 card.

FIG. 8 is a block diagram illustrating an example of a configuration of the L2-1 card. The configuration of the L2-1 card is illustrated merely as an example in FIG. 8 and is not limited thereto. The L2-1 card 130 includes a signal path control unit 131, a connection relation information table 132, a connection template table 133, an inter-card communication unit 134, a UL (UpLink) processing unit 135, and a DL (DownLink) processing unit 136.

The UL processing unit 135 includes a UL PDCP (UpLink PDCP) processing unit 135*a* and a UL RLC (UpLibk RLC) processing unit 135*b*. The DL processing unit 136 includes a DL PDCP (DownLink PDCP) processing unit 136*a* and a DL RLC (DownLink RLC) processing unit 136*b*.

The signal path control unit 131 receives a signal path establishment request for each of the first to third channels including the connection relation information from the L2-2 card 120 or the like through the inter-card communication unit 134. The signal path control unit 131 then determines whether or not its own card is included in the connection relation information that is included in the signal path establishment request being received. The signal path control unit 131 executes the following processing when the own card is included in the connection relation information that is included in the signal path establishment request being received.

That is, the signal path control unit 131 extracts, from the connection relation information included in the signal path establishment request being received, an entry of the "card type" matching the "input" and "output" of the connection template table 133 as well as an entry including the "transmission path 1 card" and the "transmission path 2 card". Then, the signal path control unit 131 registers the extracted connection relation information into the connection relation information table 132. Details of the connection relation information table 132 will be described later with reference to FIGS. 20B and 24B. Details of the connection template table 133 will be described later with reference to FIG. 9.

When it is determined on the basis of the connection relation information table 132 and the connection template table 133 that there exists another processing card establishing a signal path, the signal path control unit 131 transmits a signal path establishment request including the connection relation information to the other processing card through the inter-card communication unit 134. Here, the other processing card is the processing card that is included in the connection relation information registered in the connection relation information table 132, where connection relation between the processing card and the own card is defined in the connection template table 133 while the signal path therebetween is not yet established.

The signal path control unit 131 then transmits, through the inter-card communication unit 134, a signal path establishment response to the L2-2 card 120, the response indicating that the signal path is established with the L2-2 card 120, for example, which transmits the connection relation information.

The L2-1 card 130 thus establishes the signal path of each of the first to third channels among all processing cards included in the connection relation information that is registered in the connection relation information table 132.

After that, the UL PDCP processing unit 135*a* of the UL processing unit 135 executes PDCP processing relevant to the upload link performed via the signal path established between the processing cards through the inter-card communication unit 134. The UL RLC processing unit 135*b* of the UL processing unit 135 executes RLC processing relevant to the upload link performed via the signal path established between the processing cards through the inter-card communication unit 134.

Moreover, the UL PDCP processing unit 136*a* of the DL processing unit 136 executes PDCP processing relevant to the download link performed via the signal path established between the processing cards through the inter-card communication unit 134. The DL RLC processing unit 136*b* of the DL processing unit 136 executes RLC processing relevant to the download link performed via the signal path established between the processing cards through the inter-card communication unit 134.

Connection Template Table Included in L2-1 Card

FIG. 9 illustrates an example of the connection template table included in the L2-1 card. FIG. 9 merely illustrates an example of the connection template table included in the L2-1 card, where the information in the table is not limited to what is illustrated. The connection template table 133 included in the L2-1 card 130 is a piece of information referenced when the signal path control unit 131 constructs a signal path of a channel on the basis of the connection relation information received from the L2-2 card 120. The configuration of the connection template table 133 is similar to the configuration of each of the connection template table 113 included in the call control card 110 and the connection template table 123 included in the L2-2 card 120.

The "input" and "output" to/from the L2-2 card 120 both indicate "-" and are undefined for the signal path of the channel with the "path type" being the "first channel" and the "link type" being the "UL" and "DL", for example.

Moreover, the "L1 card" is the "input" to the L2-1 card 130 while the "L2-2 card" is the "output" from the L2-1 card 130 concerning the signal path of the channel with the "path type" being the "second channel" and the "link type" being the "UL1". The "L1 card" is the "input" to the L2-1 card 130 while the "call control card" is the "output" from the L2-1 card 130 concerning the signal path of the channel with the "path type" being the "second channel" and the "link type" being the "UL2".

Moreover, the "call control card" is the "input" to the L2-1 card 130 while the "L1 card" is the "output" from the L2-1 card 130 concerning the signal path of the channel with the "path type" being the "second channel" and the "link type" being the "DL1". The "call control card" is the "input" to the L2-1 card 130 while the "L2-2 card" is the "output" from the L2-1 card 130 concerning the signal path of the channel with the "path type" being the "second channel" and the "link type" being the "DL2".

Moreover, the "L1 card" is the "input" to the L2-1 card 130 while the "L2-2 card" is the "output" from the L2-1 card 130 concerning the signal path of the channel with the "path type" being the "third channel" and the "link type" being the "UL1". The "L1 card" is the "input" to the L2-1 card 130 while the "transmission path 1 card" is the "output" from the L2-1 card 130 concerning the signal path of the channel with the "path type" being the "third channel" and the "link type" being the "UL2".

Moreover, the "L1 card" is the "input" to the L2-1 card 130 while the "L2-2 card" is the "output" from the L2-1 card 130 concerning the signal path of the channel with the "path type" being the "third channel" and the "link type" being the "DL1". The "L2-2 card" is the "input" to the L2-1 card 130 while the "L1 card" is the "output" from the L2-1 card 130 concerning the signal path of the channel with the "path type" being the "third channel" and the "link type" being the "DL2".

Configuration of L1 Card

Figure 10:
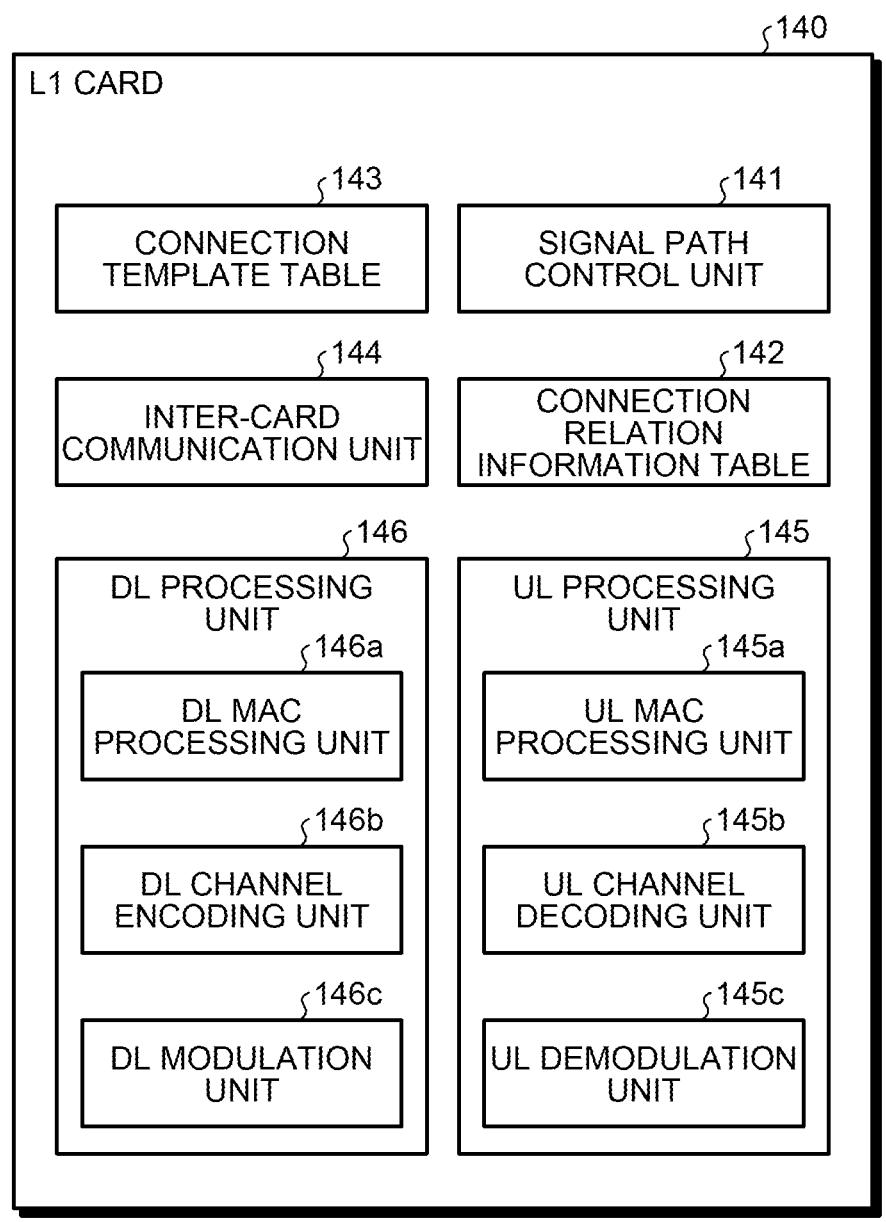
FIG. 10 is a block diagram illustrating an example of a configuration of an L1 card.

FIG. 10 is a block diagram illustrating an example of a configuration of the L1 card. The configuration of the L1 card is illustrated merely as an example in FIG. 10 and is not limited thereto. The L1 card 140 includes a signal path control unit 141, a connection relation information table 142, a connection template table 143, an inter-card communication unit 144, a UL (UpLink) processing unit 145, and a DL (DownLink) processing unit 146.

The UL processing unit 145 includes a UL MAC (UpLink Media Access Control) processing unit 145*a*, a UL (UpLink) channel decoding unit 144*b*, and a UL (UpLink) demodulation unit 145*c*. The DL processing unit 146 includes a DL MAC (DownLink Media Access Control) processing unit 146*a*, a DL channel encoding unit 146*b*, and a DL (DownLink) modulation unit 146*c*.

The signal path control unit 141 receives a signal path establishment request for each of the first to third channels including the connection relation information from the L2-2 card 120 or the like through the inter-card communication unit 144. The signal path control unit 141 then determines whether or not its own card is included in the connection relation information that is included in the signal path establishment request being received. The signal path control unit 141 executes the following processing when the own card is included in the connection relation information that is included in the signal path establishment request being received.

That is, the signal path control unit 141 extracts, from the connection relation information included in the signal path establishment request being received, an entry of the "card type" matching that in the connection template table 143 as well as an entry including the "transmission path 1 card" and the "transmission path 2 card". Then, the signal path control unit 141 registers the extracted connection relation information into the connection relation information table 142. Details of the connection relation information table 142 will be described later with reference to FIGS. 16B, 20C and 24C. Details of the connection template table 143 will be described later with reference to FIG. 11.

When it is determined on the basis of the connection relation information table 142 and the connection template table 143 that there exists another processing card establishing a signal path, the signal path control unit 141 transmits a signal path establishment request including the connection relation information to the other processing card through the inter-card communication unit 144. Here, the other processing card is the processing card that is included in the connection relation information registered in the connection relation information table 142, where the connection relation between the processing card and the own card is defined in the connection template table 143 while the signal path therebetween is not yet established.

The signal path control unit 141 then transmits, through the inter-card communication unit 144, a signal path establishment response to the L2-2 card 120, the response indicating that the signal path is established with the L2-2 card 120, for example, which transmits the connection relation information.

The L1 card 140 thus establishes the signal path of each of the first to third channels among all processing cards included in the connection relation information that is registered in the connection relation information table 142.

After that, the UL MAC processing unit 145*a* of the UL processing unit 145 executes MAC processing relevant to the upload link performed via the signal path established between the processing cards through the inter-card communication unit 144. A UL channel decoding unit 145*b* of the UL processing unit 145 executes channel decoding relevant to the upload link performed via the signal path established between the processing cards through the inter-card communication unit 134. The UL demodulation unit 145*c* of the UL processing unit 145 executes demodulation relevant to the upload link performed via the signal path established between the processing cards through the inter-card communication unit 144.

Moreover, the DL MAC processing unit 146*a* of the DL processing unit 146 executes MAC processing relevant to the download load link performed via the signal path established between the processing cards through the inter-card communication unit 144. The DL channel encoding unit 146*b* of the DL processing unit 146 executes channel encoding relevant to the download link performed via the signal path established between the processing cards through the inter-card communication unit 144. Moreover, the DL modulation unit 146*c* of the DL processing unit 146 executes modulation relevant to the download link performed via the signal path established between the processing cards through the inter-card communication unit 144.

Connection Template Table Included in L1 Card

FIG. 11 illustrates an example of the connection template table included in the L1 card. FIG. 11 merely illustrates an example of the connection template table included in the L1 card, where the information in the table is not limited to what is illustrated. The connection template table 143 included in the L1 card 140 is a piece of information referenced when the signal path control unit 141 constructs a signal path of a channel on the basis of the connection relation information received from the L2-2 card 120. The configuration of the connection template table 143 is similar to the configuration of each of the connection template table 113 included in the call control card 110, the connection template table 123 included in the L2-2 card 120, and the connection template table 133 included in the L2-1 card 130.

Concerning the signal path of the channel with the "path type" being the "first channel" and the "link type" being the "UL1", for example, the "transmission path 2 card" is the "input" to the L1 card 140 while the "call control card" is the "output" from the L1 card 140. The "transmission path 2 card" is the "input" to the L1 card 140 while the "L2-2 card" is the "output" from the L1 card 140 concerning the signal path of the channel with the "path type" being the "first channel" and the "link type" being the "UL2".

Moreover, the "call control card" is the "input" to the L1 card 140 while the "transmission path 2 card" is the "output" from the L1 card 140 concerning the signal path of the channel with the "path type" being the "first channel" and the "link type" being the "DL1". The "L2-2 card" is the "input" to the L1 card 140 while the "transmission path 2 card" is the "output" from the L1 card 140 concerning the signal path of the channel with the "path type" being the "first channel" and the "link type" being the "DL2".

Moreover, the "transmission path 2 card" is the "input" to the L1 card 140 while the "L2-1 card" is the "output" from the L1 card 140 concerning the signal path of the channel with the "path type" being the "second channel" and the "link type" being the "UL1". The "transmission path 2 card" is the "input" to the L1 card 140 while the "L2-2 card" is the "output" from the L1 card 140 concerning the signal path of the channel with the "path type" being the "second channel" and the "link type" being the "UL2".

Moreover, the "L2-1 card" is the "input" to the L1 card 140 while the "transmission path 2 card" is the "output" from the L1 card 140 concerning the signal path of the channel with the "path type" being the "second channel" and the "link type" being the "DL1". The "L2-2 card" is the "input" to the L1 card 140 while the "transmission path 2 card" is the "output" from the L1 card 140 concerning the signal path of the channel with the "path type" being the "second channel" and the "link type" being the "DL2".

Moreover, the "transmission path 2 card" is the "input" to the L1 card 140 while the "L2-1 card" is the "output" from the L1 card 140 concerning the signal path of the channel with the "path type" being the "third channel" and the "link type" being the "UL1". The "transmission path 2 card" is the "input" to the L1 card 140 while the "L2-2 card" is the "output" from the L1 card 140 concerning the signal path of the channel with the "path type" being the "third channel" and the "link type" being the "UL2".

Moreover, the "L2-1 card" is the "input" to the L1 card 140 while the "transmission path 2 card" is the "output" from the L1 card 140 concerning the signal path of the channel with the "path type" being the "third channel" and the "link type" being the "DL1". The "L2-2 card" is the "input" to the L1 card 140 while the "transmission path 2 card" is the "output" from the L1 card 140 concerning the signal path of the channel with the "path type" being the "third channel" and the "link type" being the "DL2".

Configuration of Transmission Path 1 Card

Figures 12, 13:
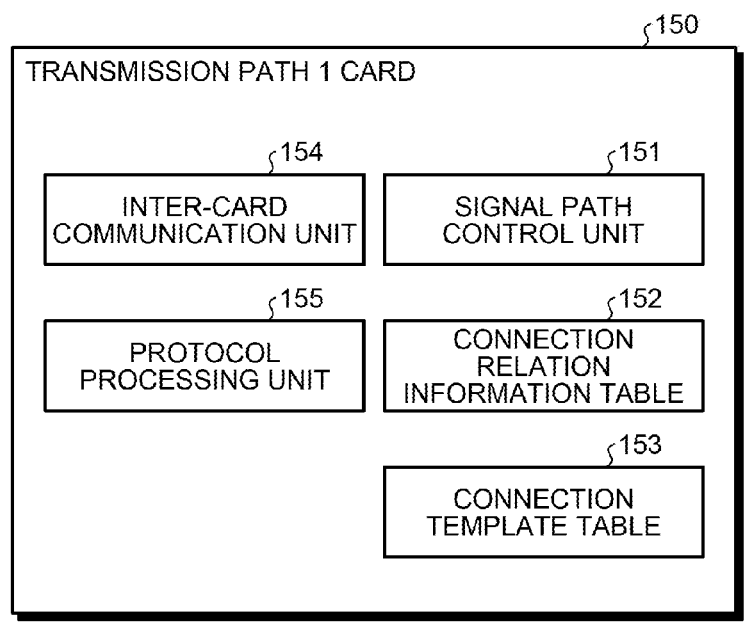
FIG. 12 is a block diagram illustrating an example of a configuration of a transmission path 1 card.
FIG. 13 illustrates an example of a connection template table included in the transmission path 1 card.

FIG. 12 is a block diagram illustrating an example of a configuration of the transmission path 1 card. The transmission path 1 card 150 includes a signal path control unit 151, a connection relation information table 152, a connection template table 153, an inter-card communication unit 154, and a protocol processing unit 155.

The signal path control unit 151 receives a signal path establishment request for the MME, the second channel or the third channel including the connection relation information from the call control card 110 or the like through the inter-card communication unit 154. The signal path control unit 151 then determines whether or not its own card is included in the connection relation information that is included in the signal path establishment request being received. The signal path control unit 151 executes the following processing when the own card is included in the connection relation information that is included in the signal path establishment request being received.

That is, the signal path control unit 151 extracts, from the connection relation information included in the signal path establishment request being received, an entry of the "card type" matching the "input" and "output" of the connection template table 153 as well as an entry including the "transmission path 1 card" and the "transmission path 2 card". Then, the signal path control unit 151 registers the extracted connection relation information into the connection relation information table 152. Details of the connection relation information table 152 will be described later with reference to FIGS. 20D and 24D. Details of the connection template table 153 will be described later with reference to FIG. 13.

When it is determined on the basis of the connection relation information table 152 and the connection template table 153 that there exists another processing card establishing a signal path, the signal path control unit 151 transmits a signal path establishment request including the connection relation information to the other processing card through the inter-card communication unit 154. Here, the other processing card is the processing card that is included in the connection relation information registered in the connection relation information table 152, where the connection relation between the processing card and the own card is defined in the connection template table 153 while the signal path therebetween is not yet established.

The signal path control unit 151 then transmits, through the inter-card communication unit 154, a signal path establishment response to the call control card 110, the response indicating that the signal path is established with the call control card 110, for example, which transmits the connection relation information.

The transmission path 1 card 150 thus establishes the signal path of the MME, the second channel or the third channel among all processing cards included in the connection relation information that is registered in the connection relation information table 152.

After that, the protocol processing unit 155 executes predetermined protocol processing relevant to the upload link and download link performed via the signal path established between the processing cards through the inter-card communication unit 154.

Note that the configuration of the transmission path 2 card 160 is similar to that of the transmission path 1 card 150 except for the following point. That is, the transmission path 2 card 160 configures a signal path between the L1 card 140 and the RE 200 in all of the first to third channels. On the other hand, the transmission path 1 card 150 does not configure a signal path in the first channel, configures a signal path between the MME and the call control card 110 in the second channel, and configures a signal path between the MME and the L2-1 card 130 in the third channel.

Connection Template Table Included in Transmission Path 1 Card

FIG. 13 illustrates an example of the connection template table included in the transmission path 1 card. FIG. 13 merely illustrates an example of the connection template table included in the transmission path 1 card, where the information in the table is not limited to what is illustrated.

The connection template table 153 included in the transmission path 1 card 150 is a piece of information referenced when the signal path control unit 151 constructs a signal path of a channel on the basis of the connection relation information received from the call control card 110. The configuration of the connection template table 153 is similar to the configuration of each of the connection template tables 113, 123, 133, and 143 included in the call control card 110, the L2-2 card 120, the L2-1 card 130, and the L1 card 140, respectively.

The "input" and "output" to/from the transmission path 1 card 150 both indicate "-" and are undefined for the signal path of the channel with the "path type" being the "first channel" and the "link type" being the "UL" and "DL", for example.

Moreover, the "MME" is the "input" to the transmission path 1 card 150 while the "call control card" is the "output" from the transmission path 1 card 150 concerning the signal path of the channel with the "path type" being the "second channel" and the "link type" being the "UL". The "call control card" is the "input" to the transmission path 1 card 150 while the "MME" is the "output" from the transmission path 1 card 150 concerning the signal path of the channel with the "path type" being the "second channel" and the "link type" being the "DL".

Moreover, the "MME" is the "input" to the transmission path 1 card 150 while the "L2-1 card" is the "output" from the transmission path 1 card 150 concerning the signal path of the channel with the "path type" being the "third channel" and the "link type" being the "UL". The "L2-1 card" is the "input" to the transmission path 1 card 150 while the "MME" is the "output" from the transmission path 1 card 150 concerning the signal path of the channel with the "path type" being the "third channel" and the "link type" being the "DL".

Signal Path Establishment Processing for First Channel

Figure 14:
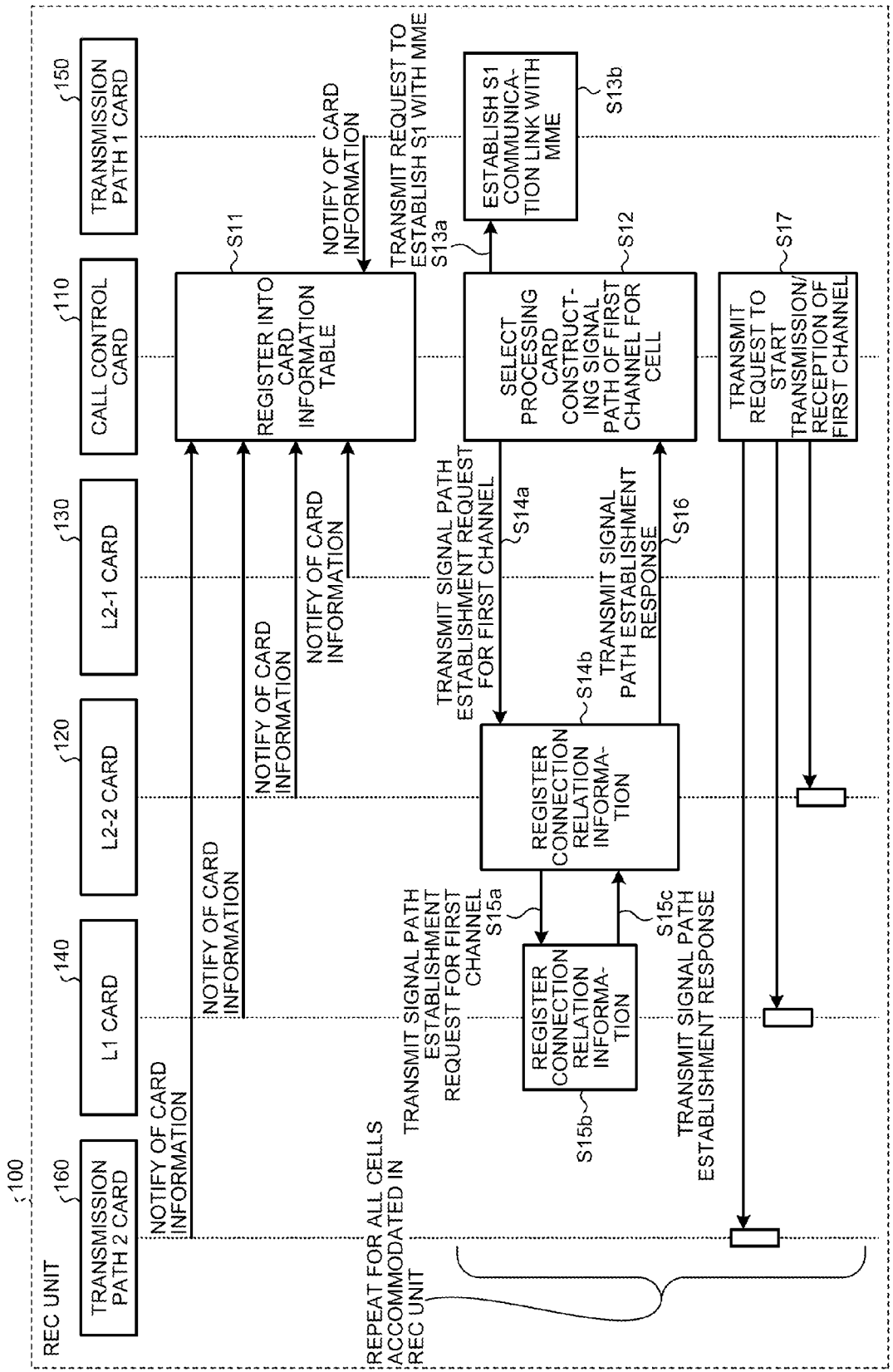
FIG. 14 is a sequence diagram illustrating an example of signal path establishment processing for a first channel.

FIG. 14 is a sequence diagram illustrating an example of signal path establishment processing for the first channel. FIG. 14 illustrates the sequence after the REC unit 100 is started up. A main signal path for the first channel is configured by connecting the call control card 110, the L1 card 140, and the transmission path 2 card 160. Note that while the REC unit 100 accommodates one of each of the processing cards in FIG. 14 for the sake of simplifying description, similar processing is performed when the REC unit accommodates a plurality of each of the processing cards.

First, the call control card 110 registers the card information received from each of the L2-2 card 120, the L2-1 card 130, the L1 card 140, the transmission path 1 card 150, and the transmission path 2 card 160 into the card information table 114 (step S11). The call control card 110 then selects the processing card configuring the first channel from the card information table 114 (step S12). The call control card 110 transmits the request to establish S1 with the MME to the transmission path 1 card 150 (step S13a). In response to the request from the transmission path 1 card 150 to establish S1 with the MME, the transmission path 1 card 150 establishes an S1 communication link with the MME (step S13b).

On the other hand, the call control card 110 transmits to the L2-2 card 120 an establishment request including the connection relation information that is a piece of information on the processing card configuring the signal path of the first channel (step S14a). The L2-2 card 120 extracts, from the connection relation information relevant to the first channel transmitted from the call control card 110, an entry of the "card type" matching the "input" and "output" of the connection template table 123 as well as an entry including the "transmission path 1 card" and the "transmission path 2 card". Then, the L2-2 card 120 registers the extracted connection relation information into the connection relation information table 122 (step S14b).

The L2-2 card 120 then transmits to the L1 card 140 the signal path establishment request for the first channel including the connection relation information that is received from the call control card 110 (step S15a). The L1 card 140 extracts, from the connection relation information relevant to the first channel transmitted from the L2-2 card 120, an entry of the "card type" matching the "input" and "output" of the connection template table 143 as well as an entry including the "transmission path 1 card" and the "transmission path 2 card". Then, the L1 card 140 registers the extracted connection relation information into the connection relation information table 142 (step S15b).

Subsequently, the L1 card 140 registers the connection relation information in a normal manner, establishes the signal path with the call control card 110, the L2-2 card 120, and the transmission path 2 card 160, and transmits the signal path establishment response to the L2-2 card 120 (step S15c). Upon registering the connection relation information in a normal manner and receiving the signal path establishment response from the L1 card 140, the L2-2 card 120 transmits the signal path establishment response to the call control card 110 (step S16).

Upon receiving the signal path establishment response from the L2-2 card 120, the call control card 110 transmits a request to start transmission/reception of the first channel to the L2-2 card 120, the L1 card 140, and the transmission path 2 card 160 (step S17). The call control card 110 performs the series of processing from step S12 to step S17 on all cells accommodated in the REC unit 100.

The L1 card 140 receives the request to start transmission/reception of the first channel and then starts outputting an IQ (In-phase/Quadrature) signal to which the PDCCH, PCFICH or the like is mapped. The L1 card 140 then transmits a radio signal indicated by the IQ data through the radio unit (RE 200). Note that the PDCCH stands for a Physical Downlink Control Channel, and the PCFICH stands for a Physical Control Format Indicator Channel.

The L1 card 140 may instead output an IQ signal to which report information (such as MIB information or SIB information) is mapped, the report information being transmitted in a logical channel (BCCH) at a predetermined timing on the basis of an instruction from the call control card 110 that configures the signal path of the first channel. Note that the BCCH stands for a Broadcast Control Channel, the MIB stands for a Master Information Block, and the SIB stands for a System Information Block.

The PDCP processing is not performed on the report information (MIB information or SIB information) according to the specification of 3GPP (3rd Generation Partnership Project: registered trademark). Moreover, the RLC set in a TM (Transparent Mode) to the report information (such as MIB information or SIB information) is not performed thereon. The REC unit 100 can thus output the IQ signal to which the report information is mapped by using the signal path not including the L2-1 card 130 (the signal path of the first channel configured by the "call control card", the "L2-2 card", the "L1 card", and the "transmission path 2 card").

Moreover, the L1 card 140 can notify the call control card 110, which configures the signal path of the first channel, of the result of processing performed against the UL (UpLink) signal such as PRACH or RRC from a mobile station accommodated in the REC unit 100. Note that the PRACH stands for a Physical Common Packet Channel, and the RRC stands for a Radio Resource Control.

The RLC processing is not performed on the PRACH according to the specification of the 3GPP. Moreover, the PDCP processing is not performed on the RRC, nor is the RLC set in the TM (Transparent Mode) to the RRC signal (Radio Resource Control Connection Request) performed thereon. The REC unit 100 can thus process the UL signal such as the PRACH signal and RRC signal by using the signal path not including the L2-1 card 130 (the signal path of the first channel configured by the "call control card", the "L2-2 card", the "L1 card", and the "transmission path 2 card").

When the registration processing of the connection relation information results in failure, each processing card may return a path establishment response (negative response) indicating that the registration processing is not completed normally. The negative response can contain information such as the card type and the card number of the processing card for which the registration processing has failed. The call control card 110 may reselect a card of the same type as the card indicated in the negative response and transmit a path establishment request, when receiving the path establishment response (negative response) indicating that the registration processing is not completed normally.

Connection Relation Information Included in Signal Path Establishment Request for First Channel FIG. 15 is a table illustrating an example of the connection relation information included in the signal path establishment request for the first channel. FIG. 15 illustrates an example of the connection relation information included in the signal path establishment request that is transmitted in step S14*a* and step S15*a* illustrated in FIG. 14.

FIG. 15 illustrates information (connection relation information) on the connection relation of all processing cards that are selected as the processing cards configuring the signal path of the first channel by the call control card 110. The call control card 110 generates the connection relation information illustrated in FIG. 15 on the basis of the content of the card information table 114. The call control card 110 then transmits the path establishment request for the first channel including the connection relation information generated to the processing card of the card type such as the L2-2 card 120, among the selected cards.

The connection relation information illustrated in FIG. 15 is a list of information on the processing card configuring the first channel, and includes columns corresponding to a "cell number", a "path type", a "card number", a "card type", and "address information". The "cell number" indicates information that identifies a cell to which the first channel is assigned. The "cell number" is a PCID (Physical Cell IDentifier) or a GCID (Global Cell IDentifier), for example. The "path type" indicates the type of a path established by the path establishment request. FIG. 15 illustrates the example where the path type is the first channel since the connection relation information is included in the path establishment request for the first channel.

In performing the signal path establishment processing for the first channel illustrated in FIG. 14, for example, the signal path for the first channel is configured among the processing cards with the "card numbers" being "1", "21", and "22" by using the connection relation information illustrated in FIG. 15.

Connection Relation Information Table Relevant to Signal Path of First Channel Registered in L2-2 Card FIG. 16A illustrates an example of the connection relation information table relevant to the signal path for the first channel registered in the L2-2 card. FIG. 16A illustrates an example of the connection relation information registered in the connection relation information table 122 by the L2-2 card 120 in step S14*b* illustrated in FIG. 14.

The L2-2 card 120 extracts, from the connection relation information relevant to the first channel transmitted from the call control card 110, an entry of the "card type" matching the "input" and "output" of the connection template table 123 as well as an entry including the "transmission path 1 card" and the "transmission path 2 card". Then, the L2-2 card 120 registers the extracted connection relation information in the connection relation information table 122 illustrated in FIG. 16A as the connection relation information relevant to the signal path of the first channel.

As a result, the L2-2 card 120 performs scheduling processing on the L1 card with the "card number" being "1" among the five L1 cards with the "card numbers" from "1" to "5" illustrated in FIG. 5, for example, on the basis of the connection relation information registered for the signal path of the first channel.

Connection Relation Information Table Relevant to Signal Path of First Channel Registered in L1 Card FIG. 16B illustrates an example of the connection relation information table relevant to the signal path for the first channel registered in the L1 card. FIG. 16A illustrates an example of the connection relation information registered in the connection relation information table 142 by the L1 card 140 in step S15*b* illustrated in FIG. 14.

The L1 card 140 extracts, from the connection relation information relevant to the first channel transmitted from the L2-2 card 120, an entry of the "card type" matching the "input" and "output" of the connection template table 143 as well as an entry including the "transmission path 1 card" and the "transmission path 2 card". Then, the L1 card 140 registers the extracted connection relation information in the connection relation information table 142 as the connection relation information relevant to the signal path of the first channel.

As a result, the L1 card 140 is subjected to scheduling control by the L2-2 card with the "card number" being "6" among the eight L2-2 cards with the "card numbers" from "6" to "13" illustrated in FIG. 5, for example, on the basis of the connection relation information registered for the signal path of the first channel.

Moreover, the L1 card 140 notifies the call control card (main call control card) with the "card number" being "21" of the result of processing on the MAC layer among the three call control cards with the "card numbers" from "19" to "21", in the uplink signal path of the first channel.

Signal Path Established by Signal Path Establishment Processing for First Channel FIG. 17 is a block diagram illustrating an example of the signal path established by the signal path establishment processing for the first channel. FIG. 17 illustrates an example where sRIO (Serial Rapid Input/Output: registered trademark) being high-speed serial communication is used for communication among the processing cards within the REC unit 100 (for intra-REC unit 100 communication).

As illustrated in FIG. 17, the call control card 110 and the L1 card 140 perform two-way communication therebetween via sRIO. The L1 card 140 and the transmission path 2 card 160 perform two-way communication therebetween via sRIO. The transmission path 2 card 160 and the RE perform two-way communication therebetween via CPRI. The L2-2 card 120 and the L1 card 140 perform two-way communication between the MAC layers of both cards.

The sRIO communication uses a card number (number assigned to a card slot) as a destination address. A communication layer between an LTE (Long Term Evolution: registered trademark) protocol layer and the sRIO layer is omitted in FIG. 17. However, for example, there can be provided between the LTE protocol layer and the sRIO layer an inter-card interface layer that specifies an address between the cards by using an IP address. In the inter-card interface layer, an address card of a signal from a higher layer (such as the MAC layer for LTE) is specified by using the IP address. Then, in the inter-card interface layer, the card number is identified in the end from the IP address specified, whereby the inter-card communication is performed via the sRIO layer by using the card number identified.

A list similar to that of the card information table illustrated in FIG. 5 may be used for processing that performs conversion between the IP address and the card number. Alternatively, it may be adapted to generate a correspondence table between the MAC address and the card number upon receiving the "notification of the card information" as illustrated in FIG. 14 and use an existing ARP (Address Resolution Protocol) table. Then, the MAC-card number correspondence table may be used to identify the card number from the MAC address upon going through the conversion between the IP address and the MAC address.

Signal Path Establishment Processing for Second Channel

FIG. 18 is a sequence diagram illustrating an example of signal path establishment processing for the second channel. FIG. 18 illustrates the sequence for establishing a signal path of the second channel after establishing the signal path of the first channel in the REC unit 100. Moreover, FIG. 18 illustrates the sequence executed to establish the signal path of the second channel for a mobile station that transmits an RRC signal, when "a UL signal of the RRC signal is received" in a radio connection sequence of the mobile station accommodated in the REC unit 100, for example. Note that the RRC signal is a Radio Resource Control Connection Request.

The main signal path of the second channel is configured by connecting the call control card 110, the L2-2 card 120, the L2-1 card 130, the L1 card 140, the transmission path 1 card 150, and the transmission path 2 card 160. Note that while the REC unit 100 accommodates one of each of the processing cards in FIG. 18 for the sake of simplifying description, similar processing is performed when the REC unit accommodates a plurality of each of the processing cards.

First, the call control card 110 selects the processing card configuring the second channel from the card information table 114 (step S21). The call control card 110 then transmits the signal path establishment request for the second channel to the transmission path 1 card 150 (step S22a).

The transmission path 1 card 150 extracts, from the connection relation information relevant to the second channel transmitted from the call control card 110, an entry of the "card type" matching the "input" and "output" of the connection template table 153 as well as an entry including the "transmission path 1 card" and the "transmission path 2 card". Then, the transmission path 1 card 150 registers the extracted connection relation information into the connection relation information table 152 (step S22b). Upon registering the connection relation information into the connection relation information table 152 in a normal manner, the transmission path 1 card 150 transmits the signal path establishment response to the call control card 110 (step S22c).

On the other hand, the call control card 110 transmits to the L2-2 card 120 an establishment request including the connection relation information that is a piece of information on the processing card configuring the signal path of the second channel (step S23a). The L2-2 card 120 extracts, from the connection relation information relevant to the second channel transmitted from the call control card 110, an entry of the "card type" matching the "input" and "output" of the connection template table 123 as well as an entry including the "transmission path 1 card" and the "transmission path 2 card". Then, the L2-2 card 120 registers the extracted connection relation information into the connection relation information table 122 (step S23b).

The L2-2 card 120 then transmits to the L2-1 card 130 the signal path establishment request for the second channel including the connection relation information that is received from the call control card 110 (step S24a). The L2-1 card 130 extracts, from the connection relation information relevant to the second channel transmitted from the L2-2 card 120, an entry of the "card type" matching the "input" and "output" of the connection template table 133 as well as an entry including the "transmission path 1 card" and the "transmission path 2 card". Then, the L2-1 card 130 registers the extracted connection relation information into the connection relation information table 132 (step S24b). Upon registering the connection relation information into the connection relation information table 132 in a normal manner, the L2-1 card 130 transmits the signal path establishment response to the L2-2 card 120 (step S24c).

The L2-2 card 120 then transmits to the L1 card 140 the signal path establishment request for the second channel including the connection relation information that is received from the call control card 110 (step S25a). The L1 card 140 extracts, from the connection relation information relevant to the second channel transmitted from the L2-2 card 120, an entry of the "card type" matching the "input" and "output" of the connection template table 143 as well as an entry including the "transmission path 1 card" and the "transmission path 2 card". Then, the L1 card 140 registers the extracted connection relation information into the connection relation information table 142 (step S25b).

Upon registering the connection relation information into the connection relation information table 142 in a normal manner, the L1 card 140 transmits the signal path establishment response to the L2-2 card 120 (step S25c). The L2-2 card 120 then transmits the signal path establishment response to the call control card 110 (step S26) upon receiving the signal path establishment response from the L1 card 140.

Note that when the registration processing of the connection relation information results in failure, each processing card may transmit a path establishment response (negative response) indicating that the registration processing is not completed normally. The negative response can contain information such as the "card type" and the "card number" of the processing card for which the registration processing has failed. The call control card 110 may reselect another processing card of the same type as the card indicated in the negative response and transmit a signal path establishment request, when receiving the negative response.

Connection Relation Information Included in Signal Path Establishment Request for Second Channel FIG. 19 is a table illustrating an example of the connection relation information included in the signal path establishment request for the second channel. FIG. 19 illustrates an example of the connection relation information included in the signal path establishment request that is transmitted in steps S22a, S23a and S25a illustrated in FIG. 18.

That is, the call control card 110 selects the processing card constructing the signal path of the second channel on the basis of the content registered in the card information table 114. The call control card 110 for example selects a piece of card information for each of all the "card types" as information on the processing card constructing the signal path of the second channel.

The call control card 110 then generates the connection relation information including all the processing cards selected as the processing cards constructing the signal path of the second channel, on the basis of the content registered in the card information table 114. Then, the call control card 110 transmits the path establishment request for the second channel including the connection relation information generated to the processing card of the "card type" being the "L2-2 card" and the "transmission path 1 card", among the selected processing cards.

The connection relation information transmitted to the transmission path 1 card 150 by the call control card 110 may be the same as the connection relation information transmitted to the L2-2 card 120. Alternatively, the connection relation information transmitted to the transmission path 1 card 150 by the call control card 110 may be a portion extracted from the connection relation information transmitted to the L2-2 card 120. The connection relation information may, for example, contain only information relevant to the call control card 110 having a direct connection relation in the signal path of the second channel.

In addition to the content registered in the card information table 114, "resource identification information" is added to the connection relation information being generated. The resource identification information may be a piece of information identifying a call (bearer) (such as EPS (Evolved Packet System) Bearer Identity), for example. The resource identification information may also be a piece of information identifying the mobile station accommodated in the REC unit 100 (such as a C-RNTI (Cell-Radio Network Temporary Identifier)). Alternatively, the resource identification information may be a combination of the information identifying the call and the information identifying the mobile station.

Note that the C-RNTI can have the same value between cells. A resource can be uniquely identified by the combination of a cell number and the resource identification information (C-RNTI) when a resource of a plurality of cells is assigned to one processing card. The information identifying the call has a unique value in the REC unit 100. That is, the information identifying the call has a unique value among the cells accommodated in the REC unit 100. On the other hand, the C-RNTI is managed to be unique in each cell and thus does not have a unique value among the cells.

Connection Relation Information Table Relevant to Signal Path of Second Channel Registered in L2-2 Card FIG. 20A illustrates an example of the connection relation information table relevant to the signal path for the second channel registered in the L2-2 card. FIG. 20A illustrates an example of the connection relation information registered in the connection relation information table 122 by the L2-2 card 120 in step S23b illustrated in FIG. 18.

The L2-2 card 120 extracts, from the connection relation information relevant to the second channel transmitted from the call control card 110, an entry of the "card type" matching the "input" and "output" of the connection template table 123 as well as an entry including the "transmission path 1 card" and the "transmission path 2 card". Then, the L2-2 card 120 registers the extracted connection relation information in the connection relation information table 122 as illustrated in FIG. 20A, as the connection relation information relevant to the signal path of the second channel. When the registration processing according to the signal path establishment request for the second channel transmitted from the call control card 110 is completed normally, the L2-2 card 120 transmits a signal path establishment response (affirmative response) indicating that the registration is completed normally to the call control card 110 transmitting the signal path establishment request.

As a result, the L2-2 card 120 performs scheduling processing on the L1 card with the "card number" being "1" among the cards with the "card numbers" from "1" to "5" in the card information table 114 illustrated in FIG. 5, for example, on the basis of the connection relation information registered for the signal path of the second channel.

The L2-2 card 120 may register all of the connection relation information received from the call control card 110 or a portion extracted from the information when registering the connection relation relevant to the signal path of the second channel. Information relevant to each of the transmission path 1 card 150 and the transmission path 2 card 160 may be omitted, for example. This is because the L2-2 card 120 in the signal path of the second channel has direct connection relation with the L2-1 card 130 and the L1 card 140 but does not have direct connection relation with the transmission path 1 card 150 and the transmission path 2 card 160.

Moreover, the L2-2 card 120 transmits a path establishment request based on the connection relation information to the L1 card and the L2-1 card indicated in the connection relation information from the call control card 110. Here, the connection relation information included in the signal path establishment request for the second channel that is transmitted from the L2-2 card 120 to the L2-1 card 130 and the L1 card 140 may contain a portion extracted from the connection relation information received from the call control card 110 or all of the information.

The L2-2 card 120 may, for example, omit information relevant to the transmission path 1 card 150 from the connection relation information transmitted to the L1 card 140. This is because the L1 card 140 in the signal path of the second channel has direct connection relation with the L2-2 card 120, the L2-1 card 130, and the transmission path 2 card 160 but does not have direct connection relation with the transmission path 1 card 150.

Moreover, the L2-2 card 120 may omit information relevant to the transmission path 1 card 150 and the transmission path 2 card 160 from the connection relation information transmitted to the L2-1 card 130, for example. This is because the L2-1 card 130 in the signal path of the second channel has direct connection relation with the call control card 110, the L2-2 card 120, and the L1 card 140 but does not have direct connection relation with the transmission path 1 card 150 and the transmission path 2 card 160.

Connection Relation Information Table Relevant to Signal Path of Second Channel Registered in L2-1 Card FIG. 20B illustrates an example of the connection relation information table relevant to the signal path for the second channel registered in the L2-1 card. FIG. 20A illustrates an example of the connection relation information registered in the connection relation information table 132 by the L2-1 card 130 in step S24b illustrated in FIG. 18.

The L2-1 card 130 extracts, from the connection relation information relevant to the second channel transmitted from the L2-2 card 120, an entry of the "card type" matching the "input" and "output" of the connection template table 133 as well as an entry including the "transmission path 1 card" and the "transmission path 2 card". Then, the L2-1 card 130 registers the extracted connection relation information in the connection relation information table 132 as illustrated in FIG. 20B, as the connection relation information relevant to the signal path of the second channel.

After completing the registration processing of the connection relation information, the L2-1 card 130 transmits, to the L2-2 card 120 transmitting the path establishment request, a path establishment response (affirmative response) indicating that the registration processing is completed normally.

As a result, the L2-1 card 130 has connection relation with the L1 card with the "card number" being "1" among the cards with the "card numbers" from "1" to "5" in the card information table 114 illustrated in FIG. 5, for example, on the basis of the connection relation information registered for the signal path of the second channel.

Connection Relation Information Table Relevant to Signal Path of Second Channel Registered in L1 Card FIG. 20C illustrates an example of the connection relation information table relevant to the signal path for the second channel registered in the L1 card. FIG. 20C illustrates an example of the connection relation information registered in the connection relation information table 142 by the L1 card 140 in step S25b illustrated in FIG. 18.

The L1 card 140 extracts, from the connection relation information relevant to the second channel transmitted from the L2-2 card 120, an entry of the "card type" matching the "input" and "output" of the connection template table 143 as well as an entry including the "transmission path 1 card" and the "transmission path 2 card". Then, the L1 card 140 registers the extracted connection relation information in the connection relation information table 142 as illustrated in FIG. 20C, as the connection relation information relevant to the signal path of the second channel.

After completing the registration processing of the connection relation information, the L1 card 140 transmits, to the L2-2 card 120 transmitting the path establishment request, a path establishment response (affirmative response) indicating that the registration processing is completed normally.

As a result, the L1 card 140 has connection relation with the L2-1 card with the "card number" being "16" among the cards with the "card numbers" from "16" to "18" in the card information table 114 illustrated in FIG. 5, for example, on the basis of the connection relation information registered for the signal path of the second channel.

Connection Relation Information Table Relevant to Signal Path of Second Channel Registered in Transmission Path 1 Card FIG. 20D illustrates an example of the connection relation information table relevant to the signal path for the second channel registered in the transmission path 1 card. FIG. 20D illustrates an example of the connection relation information registered in the connection relation information table 152 by the transmission path 1 card 150 in step S22b illustrated in FIG. 18.

The transmission path 1 card 150 extracts, from the connection relation information relevant to the second channel transmitted from the call control card 110, an entry of the "card type" matching the "input" and "output" of the connection template table 153 as well as an entry including the "transmission path 1 card" and the "transmission path 2 card". Then, the transmission path 1 card 150 registers the extracted connection relation information in the connection relation information table 152 as the connection relation information relevant to the signal path of the second channel.

When the registration processing is completed normally in response to the path establishment request for the second channel transmitted from the call control card 110, the transmission path 1 card 150 transmits a path establishment response (affirmative response) indicating that the registration processing is completed normally to the call control card 110 that transmits the path establishment request.

As a result, the transmission path 1 card 150 has connection relation with the call control card (main call control card) with the "card number" being "21" among the cards with the "card numbers" from "19" to "21" in the card information table 114 illustrated in FIG. 5, for example, on the basis of the connection relation information registered for the signal path of the second channel.

Signal Path Established by Signal Path Establishment Processing for Second Channel FIG. 21 is a block diagram illustrating an example of the signal path established by the signal path establishment processing for the second channel. As with the signal path established by the signal path establishment processing for the first channel illustrated in FIG. 17, FIG. 21 illustrates the example where sRIO is used for communication among the processing cards within the REC unit 100 (for intra-REC unit 100 communication).

As illustrated in FIG. 21, the transmission path 1 card 150 and the MME perform two-way communication therebetween via Ethernet (registered trademark; the same applies hereinafter). The call control card 110 and the transmission path 1 card 150 perform two-way communication therebetween via sRIO. The call control card 110 and the L2-1 card 130 perform two-way communication therebetween via sRIO. The L2-1 card 130 and the L1 card 140 perform two-way communication therebetween via sRIO. The L1 card 140 and the transmission path 2 card 160 perform two-way communication therebetween via sRIO. The transmission path 2 card 160 and the RE perform two-way communication therebetween via CPRI.

Moreover, the L2-2 card 120 and the L2-1 card 130 perform one-way communication from the PDCP layer of the L2-1 card 130 to the MAC address layer of the L2-2 card 120. The L2-2 card 120 and the L1 card 140 perform two-way communication between the MAC layers of both cards.

Signal Path Establishment Processing for Third Channel

Figure 22:
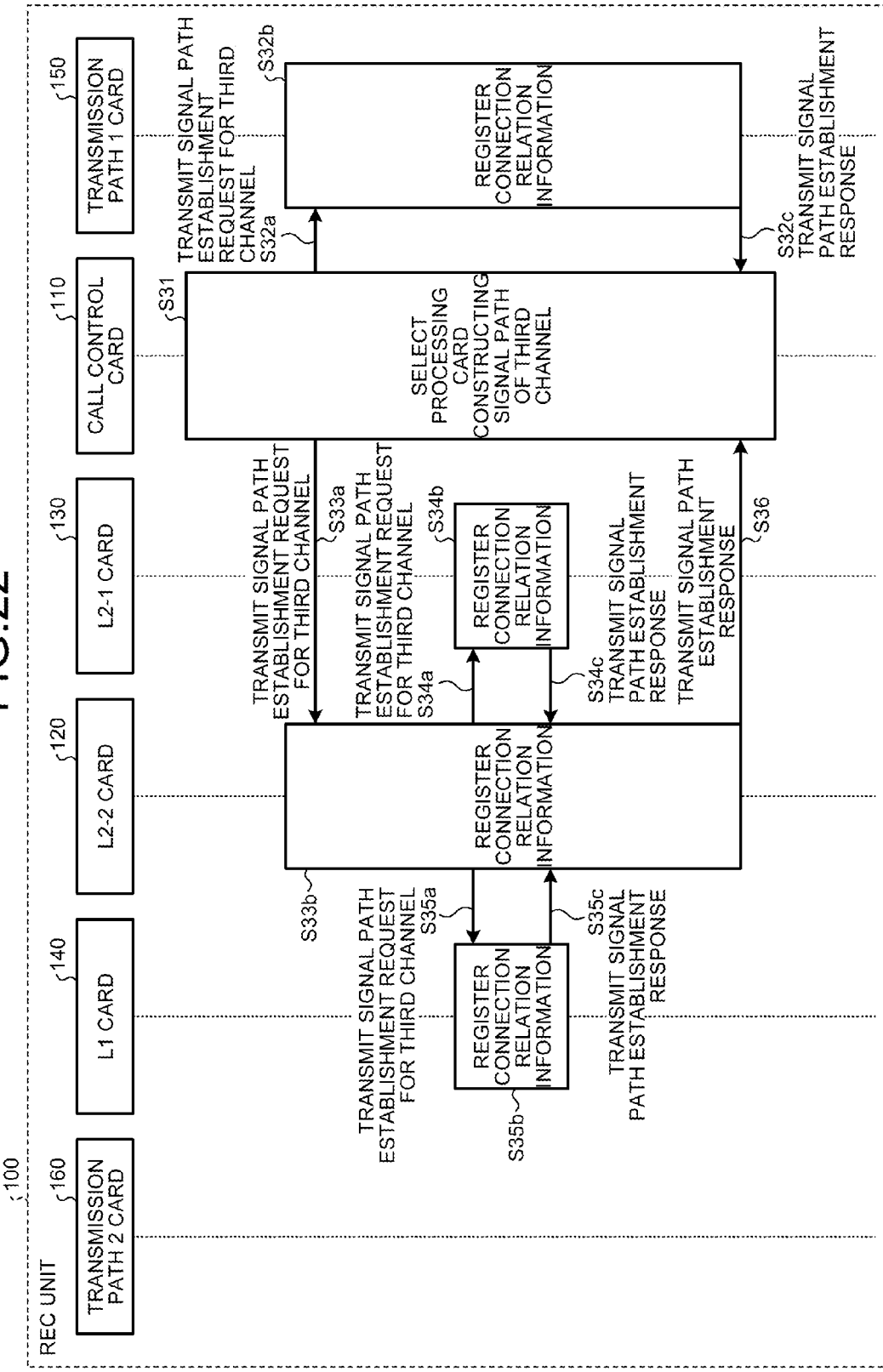
FIG. 22 is a sequence diagram illustrating an example of signal path establishment processing for a third channel.

FIG. 22 is a sequence diagram illustrating an example of signal path establishment processing for the third channel.

FIG. 22 illustrates the sequence for establishing a signal path of the third channel after establishing the signal path of the second channel in the REC unit 100. Moreover, FIG. 22 illustrates the sequence executed to establish the signal path of the second channel for a mobile station that transmits an RRC signal, when "a UL signal of the RRC signal is received" in a radio connection sequence of the mobile station accommodated in the REC unit 100, for example. The sequence illustrated in FIG. 22 is similar to that in FIG. 18.

The main signal path of the third channel is configured by connecting the L2-2 card 120, the L2-1 card 130, the L1 card 140, the transmission path 1 card 150, and the transmission path 2 card 160. Note that while the REC unit 100 accommodates one of each of the processing cards in FIG. 22 for the sake of simplifying description, processing similar to what is illustrated in the sequence diagram is performed when the REC unit accommodates a plurality of each of the processing cards.

First, the call control card 110 selects the processing card constructing the third channel from the card information table 114 (step S31). The call control card 110 then transmits the signal path establishment request for the third channel to the transmission path 1 card 150 (step S32a).

The transmission path 1 card 150 extracts, from the connection relation information relevant to the third channel transmitted from the call control card 110, an entry of the "card type" matching the "input" and "output" of the connection template table 153 as well as an entry including the "transmission path 1 card" and the "transmission path 2 card". Then, the transmission path 1 card 150 registers the extracted connection relation information into the connection relation information table 152 (step S32b). Upon registering the connection relation information into the connection relation information table 152 in a normal manner, the transmission path 1 card 150 transmits the signal path establishment response to the call control card 110 (step S32c).

On the other hand, the call control card 110 transmits to the L2-2 card 120 an establishment request including the connection relation information that is a piece of information on the processing card constructing the signal path of the third channel (step S33a). The L2-2 card 120 extracts, from the connection relation information relevant to the third channel transmitted from the call control card 110, an entry of the "card type" matching the "input" and "output" of the connection template table 123 as well as an entry including the "transmission path 1 card" and the "transmission path 2 card". Then, the L2-2 card 120 registers the extracted connection relation information into the connection relation information table 122 (step S33b).

The L2-2 card 120 then transmits to the L2-1 card 130 the signal path establishment request for the third channel including the connection relation information that is received from the call control card 110 (step S34a). The L2-1 card 130 extracts, from the connection relation information relevant to the third channel transmitted from the L2-2 card 120, an entry of the "card type" matching the "input" and "output" of the connection template table 133 as well as an entry including the "transmission path 1 card" and the "transmission path 2 card". Then, the L2-1 card 130 registers the extracted connection relation information into the connection relation information table 132 (step S34b). Upon registering the connection relation information into the connection relation information table 132 in a normal manner, the L2-1 card 130 transmits the signal path establishment response to the L2-2 card 120 (step S34c).

The L2-2 card 120 then transmits to the L1 card 140 the signal path establishment request for the third channel including the connection relation information that is received from the call control card 110 (step S35a). The L1 card 140 extracts, from the connection relation information relevant to the third channel transmitted from the L2-2 card 120, an entry of the "card type" matching the "input" and "output" of the connection template table 143 as well as an entry including the "transmission path 1 card" and the "transmission path 2 card". Then, the L1 card 140 registers the extracted connection relation information into the connection relation information table 142 (step S35b). Upon registering the connection relation information into the connection relation information table 142 in a normal manner, the L1 card 140 transmits the signal path establishment response to the L2-2 card 120 (step S35c). The L2-2 card 120 then transmits the signal path establishment response to the call control card 110 (step S36) upon receiving the signal path establishment response from the L1 card 140.

Connection Relation Information Included in Signal Path Establishment Request for Third Channel FIG. 23 is a table illustrating an example of the connection relation information included in the signal path establishment request for the third channel. FIG. 23 illustrates an example of the connection relation information included in the signal path establishment request that is transmitted in steps S32a, S33a and step S35a illustrated in FIG. 22.

That is, the call control card 110 selects the processing card constructing the signal path of the third channel on the basis of the content registered in the card information table 114. The call control card 110 for example selects, as information relevant to the processing card constructing the signal path of the third channel, a piece of card information for each card type from the "card types" including the "L2-2 card", the "L2-1 card", the "L1 card", the "transmission path 1 card" and the "transmission path 2 card".

The call control card 110 then generates the connection relation information including all the processing cards selected as the processing cards constructing the signal path of the third channel, on the basis of the content registered in the card information table 114. Then, the call control card 110 transmits the path establishment request for the third channel including the connection relation information generated to the processing card of the "card type" being the "L2-2 card" and the "transmission path 1 card", among the selected processing cards. Note that the content of the connection relation information included in the signal path establishment request for the third channel as well as a variation of the information and transmission/reception processing are similar to the connection relation information included in the signal path establishment request for the second channel illustrated in FIG. 19.

Connection Relation Information Table Relevant to Signal Path of Third Channel Registered in L2-2 Card FIG. 24A illustrates an example of the connection relation information table relevant to the signal path for the third channel registered in the L2-2 card. FIG. 24A illustrates an example of the connection relation information registered in the connection relation information table 122 by the L2-2 card 120 in step S33b illustrated in FIG. 22.

The L2-2 card 120 extracts, from the connection relation information relevant to the third channel transmitted from the call control card 110, an entry of the "card type" matching the "input" and "output" of the connection template table 123 as well as an entry including the "transmission path 1 card" and the "transmission path 2 card". Then, the L2-2 card 120 registers the extracted connection relation information in the connection relation information table 122 as illustrated in FIG. 24A, as the connection relation information relevant to the signal path of the second channel. When the registration processing is completed normally in response to the signal path establishment request for the third channel transmitted from the call control card 110, the L2-2 card 120 transmits a signal path establishment response (affirmative response) indicating that the registration processing is completed normally to the call control card 110 that transmits the signal path establishment request.

As a result, the L2-2 card 120 performs scheduling processing on the L1 card with the card number "1" among the cards with the "card numbers" from "1" to "5" in the card information table 114 illustrated in FIG. 5, for example, on the basis of the connection relation information registered for the signal path of the third channel. Note that the content and its variation of the connection relation information table relevant to the signal path for the third channel registered in the L2-2 card are similar to that of the connection relation information table relevant to the signal path for the second channel registered in the L2-2 card illustrated in FIG. 20A.

Connection Relation Information Table Relevant to Signal Path of Third Channel Registered in L2-1 Card FIG. 24B illustrates an example of the connection relation information table relevant to the signal path for the third channel registered in the L2-1 card. FIG. 24B illustrates an example of the connection relation information registered in the connection relation information table 132 by the L2-1 card 130 in step S34*b* illustrated in FIG. 22.

The L2-1 card 130 extracts, from the connection relation information relevant to the third channel transmitted from the L2-2 card 120, an entry of the "card type" matching the "input" and "output" of the connection template table 133 as well as an entry including the "transmission path 1 card" and the "transmission path 2 card". Then, the L2-1 card 130 registers the extracted connection relation information in the connection relation information table 132 as illustrated in FIG. 24B, as the connection relation information relevant to the signal path of the third channel.

After completing the registration processing of the connection relation information, the L2-1 card 130 transmits, to the L2-2 card 120 transmitting the path establishment request, a path establishment response (affirmative response) indicating that the registration processing is completed normally.

As a result, the L2-1 card 130 has connection relation with the L1 card with the card number "1" among the cards with the "card numbers" from "1" to "5" in the card information table 114 illustrated in FIG. 5, for example, on the basis of the connection relation information registered for the signal path of the third channel.

Connection Relation Information Table Relevant to Signal Path of Third Channel Registered in L1 Card FIG. 24C illustrates an example of the connection relation information table relevant to the signal path for the third channel registered in the L1 card. FIG. 24C illustrates an example of the connection relation information registered in the connection relation information table 142 by the L1 card 140 in step S35*b* illustrated in FIG. 22.

The L1 card 140 extracts, from the connection relation information relevant to the third channel transmitted from the L2-2 card 120, an entry of the "card type" matching the "input" and "output" of the connection template table 143 as well as an entry including the "transmission path 1 card" and the "transmission path 2 card". Then, the L1 card 140 registers the extracted connection relation information in the connection relation information table 142 as illustrated in FIG. 24C, as the connection relation information relevant to the signal path of the third channel.

After completing the registration processing of the connection relation information, the L1 card 140 transmits, to the L2-2 card 120 transmitting the path establishment request, a path establishment response (affirmative response) indicating that the registration processing is completed normally.

As a result, the L1 card 140 has connection relation with the L2-1 card with the card number "16" among the cards with the "card numbers" from "16" to "18" in the card information table 114 illustrated in FIG. 5, for example, on the basis of the connection relation information registered for the signal path of the third channel.

Connection Relation Information Table Relevant to Signal Path of Third Channel Registered in Transmission Path 1 Card FIG. 24D illustrates an example of the connection relation information table relevant to the signal path for the third channel registered in the transmission path 1 card. FIG. 24D illustrates an example of the connection relation information registered in the connection relation information table 152 by the transmission path 1 card 150 in step S32*b* illustrated in FIG. 22.

The transmission path 1 card 150 extracts, from the connection relation information relevant to the third channel transmitted from the call control card 110, an entry of the "card type" matching the "input" and "output" of the connection template table 153 as well as an entry including the "transmission path 1 card" and the "transmission path 2 card". Then, the transmission path 1 card 150 registers the extracted connection relation information in the connection relation information table 152 as the connection relation information relevant to the signal path of the third channel.

When the registration processing is completed normally in response to the path establishment request for the third channel transmitted from the call control card 110, the transmission path 1 card 150 transmits a path establishment response (affirmative response) indicating that the registration processing is completed normally to the call control card 110 that transmits the path establishment request.

As a result, the transmission path 1 card 150 has connection relation with the call control card (main call control card) with the card number "21" among the cards with the "card numbers" from "19" to "21" in the card information table 114 illustrated in FIG. 5, for example, on the basis of the connection relation information registered for the signal path of the third channel.

Signal Path Established by Signal Path Establishment Processing for Third Channel FIG. 25 is a block diagram illustrating an example of the signal path established by the signal path establishment processing for the third channel. As with FIGS. 17 and 21, FIG. 25 illustrates the example where sRIO is used for communication performed among the processing cards within the REC unit 100 (intra-REC unit 100 communication).

As illustrated in FIG. 25, the transmission path 1 card 150 and the MME perform two-way communication therebetween via Ethernet. The L2-1 card 130 and the transmission path 1 card 150 perform two-way communication therebetween via sRIO. The L2-1 card 130 and the L1 card 140 perform two-way communication therebetween via sRIO. The L1 card 140 and the transmission path 2 card 160 perform two-way communication therebetween via sRIO. The transmission path 2 card 160 and the RE perform two-way communication therebetween via CPRI.

Moreover, the L2-2 card 120 and the L2-1 card 130 perform one-way communication from the PDCP layer of the L2-1 card 130 to the MAC address layer of the L2-2 card 120. The L2-2 card 120 and the L1 card 140 perform two-way communication between the MAC layers of both cards.

Connection Relation Information Table Relevant to Signal Path of First to Third Channels FIG. 26 illustrates an example of the connection relation information table of the L1 card in which each connection relation information relevant to the signal path of each of the first to third channels is registered. FIG. 26 illustrates the connection relation information table 142 of the L1 card 140 as an example.

That is, FIG. 26 illustrates a mode where the entries in each of the connection relation information tables illustrated in FIGS. 16B, 20C and 24C are registered in the connection relation information table 142 in this order following the signal path establishment processing for each of the first to third channels. The L1 card 140 performs communication via the signal path of the first to third channels on the basis of information in the connection relation information table 142 illustrated in FIG. 26. Note that each of the call control card 110, the L2-2 card 120, the L2-1 card 130, the transmission path 1 card 150, and the transmission path 2 card 160 also registers and holds information in the corresponding connection relation information table as the L1 card 140 does.

Effect of Embodiment

The REC unit 100 of the embodiment manages the card information on each of one or more L1 cards 140, one or more L2-1 cards 130, and one or more L2-2 cards 120 in which the scheduling function for the communication processing performed with respect to the L1 card 140 and/or the L2-1 card 130 is implemented. The L1 card 140 handles the physical channel. The L2-1 card 130 handles the logical channel. The call control card 110 of the REC unit 100 selects, for each of the first to third channels, the processing card establishing the signal path relevant to the logical channel from among the L1 card 140, the L2-1 card 130, and the L2-2 card 120, the card information on each of which is managed. The call control card 110 transmits the connection relation information indicating a combination of the processing cards selected to each processing card included in the connection relation information. On the basis of the connection relation information, each processing card receiving the connection relation information from the call control card 110 establishes the signal path for each of the first to third channels relevant to the logical channel between the processing cards. That is, the embodiment is adapted to implement a function that processes a baseband in the base station apparatus into each processing card by a functional unit of a radio communication layer and dynamically construct connection of each processing card. The REC unit 100 can therefore construct the signal path for the first to third channels dynamically and flexibly according to the traffic including increase/decrease in the processing function, and perform radio communication using the first to third channels at the time of downlink and uplink.

Variation (First Variation) Point at which Card Information is Notified from Each Processing Card In the embodiment as illustrated in FIG. 14, for example, the point at which the card information is notified from each processing card is not particularly specified. In a first variation, for example, the card information may be notified when it is requested from the call control card 110 in FIG. 14.

In the first variation, for example, a correspondence table between the card number and the IP address may be pre-installed in each processing card. That is, it may be adapted such that each processing card recognizes by wire level the number assigned to a card slot in which its own card is accommodated at startup of the REC unit 100, and recognizes the IP address of the own card on the basis of the card number. Moreover, the number assigned to a card slot in which the main call control card is accommodated may be pre-installed to each processing card. Each processing card may also notify of the presence of the own card at startup of the REC unit 100, the notification being addressed to the card number. In response to receiving the presence notification, the main call control card uses the IP address corresponding to the card number to transmit an information request to the card from which the presence notification is transmitted, and acquires the card information.

In the first variation, communication using the IP address is performed in an application layer level such as a request for the card information, while communication using the card number is performed in the sRIO (Serial Rapid Input/Output) communication between cards. The IP communication is used in the application layer so that an existing application can be used such as an FTP application in transferring a file and an SMTP application for information notification. Moreover, the card number and the address information are pre-installed to each processing card in the first variation, whereby the address information can be omitted from the connection relation information included in the signal path establishment request for the channel.

(Second Variation) Point at which Signal Path Establishment Processing for Second Channel is Performed As a variation of the signal path establishment processing for the second channel illustrated in FIG. 18, it may be adapted to execute beforehand the signal path establishment processing for the second channel in a preceding step of the "reception of the UL signal of the RRC signal" that triggers the start of the signal path establishment processing for the second channel, and to temporarily establish the signal path for the second channel. The preceding step is a step in which a PACH from a mobile station accommodated in the REC unit 100 is received, enabling a resource to be assigned to the mobile station. In this case, the temporarily-established signal path of the second channel can be assigned to the mobile station in response to receiving the RRC signal.

Note that each control unit, each processing unit, and each communication unit executing each processing in each processing card illustrated in the embodiment may be realized by running a predetermined program in an NP, a CPU, an MPU, an ASIC and an FPGA, for example. The NP stands for a Network Processor, the CPU stands for a Central Processing Unit, and an MPU stands for a Micro Processing Unit. The ASIC stands for an Application Specific Integrated Circuit, and the FPGA stands for a Field-Programmable gate array.

Moreover, each table in each processing card illustrated in the embodiment as well as the predetermined program realizing the function of each control unit, each processing unit and each communication unit and predetermined data may be stored in a RAM (Random Access Memory) or flash memory. Alternatively, each table in each processing card illustrated in the embodiment as well as the predetermined program realizing the function of each control unit, each processing unit and each communication unit and the predetermined data may be stored in a storage device using an optical disk, a magnetic disk or a magneto-optical disk as a storage medium.

According to one aspect, a decrease in the use efficiency of the processing card in the base station apparatus can be prevented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A base station apparatus comprising:
    a management unit that manages card information on each of one or more first processing cards in which a communication layer handling a physical channel is implemented, one or more second processing cards in which a communication layer handling a logical channel is implemented, and one or more third processing cards in which a scheduling function for communication processing performed with respect to the first processing card and/or the second processing card is implemented;
    a selection unit that selects a processing card establishing a signal path relevant to the logical channel from among the first processing card, the second processing card, and the third processing card, the card information on each of which is managed by the management unit; and
    a transmission unit that transmits connection relation information indicating a combination of the processing cards selected by the selection unit to each processing card included in the connection relation information, wherein
    each processing card receiving the connection relation information from the transmission unit establishes the signal path relevant to the logical channel between the processing cards on the basis of the connection relation information.

2. The base station apparatus according to claim 1, wherein
    the transmission unit transmits the connection relation information to the third processing card,
    the third processing card registers in its own card connection relation between the own card and the first processing card and/or the second processing card on the basis of the connection relation information received from the transmission unit, establishes a signal path relevant to the logical channel between the own card and the first processing card and/or the second processing card on the basis of the connection relation, and transmits the connection relation information to the first processing card and/or the second processing card indicated in the connection relation information received from the transmission unit, and
    the first processing card and/or the second processing card register(s) in its own card(s) connection relation between the own card(s) and the third processing card on the basis of the connection relation information received from the third processing card and establishes a signal path relevant to the logical channel between the own card(s) and the third processing card on the basis of the connection relation.

3. The base station apparatus according to claim 1, wherein
    the first processing card is a processing card in which communication processing performed in a physical layer and a MAC (Media Access Control) layer in radio communication is implemented,
    the second processing card is a processing card in which communication processing performed in an RLC (Radio Link Control) layer and a PDCP (Packet Data Convergence Protocol) layer in radio communication is implemented, and
    the third processing card is a processing card in which processing relevant to scheduling of the MAC layer in radio communication is implemented.

4. The base station apparatus according to claim 1, further comprising:
    one or more of the first processing cards;
    one or more of the second processing cards;
    one or more of the third processing cards; and
    one or more fourth processing cards, each of which includes the management unit, the selection unit, and the transmission unit.

5. The base station apparatus according to claim 4, wherein
    the selection unit of the fourth processing card selects one or more of the first processing cards and one or more of the third processing cards for each cell accommodated in the base station apparatus when establishing a signal path relevant to a common control channel (CCCH) among the logical channel,
    the transmission unit of the fourth processing card transmits connection relation information indicating a combination of the first processing card and the third processing card for each of the cells selected by the selection unit to the first processing card and the third processing card, and
    each of the first processing card and the third processing card receiving the connection relation information from the fourth processing card registers mutual connection relation in its own card on the basis of the connection relation information, and establishes a signal path relevant to the common control channel for each of the cells among the first processing card, the third processing card and the fourth processing card on the basis of each connection relation registered.

6. The base station apparatus according to claim 4, wherein
    the selection unit of the fourth processing card selects one or more of the first processing cards, one or more of the second processing cards and one or more of the third processing cards when establishing a signal path relevant to a dedicated control channel (DCCH) among the logical channel,
    the transmission unit of the fourth processing card transmits connection relation information indicating a combination of the first processing card, the second processing card and the third processing card selected by the selection unit to the first processing card, the second processing card and the third processing card, and
    each of the first processing card, the second processing card and the third processing card receiving the connection relation information from the fourth processing card registers mutual connection relation in its own card on the basis of the connection relation information, and establishes a signal path relevant to the dedicated control channel among the first processing card, the second processing card, the third processing card and the fourth processing card on the basis of each connection relation registered.

7. The base station apparatus according to claim 4, wherein the selection unit of the fourth processing card selects one or more of the first processing cards, one or more of the second processing cards and one or more of the third processing cards when establishing a signal path relevant to a dedicated traffic channel (DTCH) among the logical channel, the transmission unit of the fourth processing card transmits connection relation information indicating a combination of the first processing card, the second processing card and the third processing card selected by the selection unit to the first processing card, the second processing card and the third processing card, and each of the first processing card, the second processing card and the third processing card receiving the connection relation information from the fourth processing card registers mutual connection relation in its own card on the basis of the connection relation information, and establishes a signal path relevant to the dedicated traffic channel among the first processing card, the second processing card, and the third processing card on the basis of each connection relation registered.

8. The base station apparatus according to claim 4, wherein the first processing card, the second processing card, the third processing card and the fourth processing card include:

a correspondence table storage unit that stores a correspondence table between a card number associated with a card slot into which each processing card included in the base station apparatus is inserted and an IP (Internet Protocol) address assigned in advance to the card slot;

a card number identification unit that identifies a card number on the basis of a signal detected by a point of contact with the card slot;

a fourth processing card number storage unit that stores a card number associated with a predetermined card slot into which the fourth processing card is to be inserted; and a communication processing unit that acquires an IP address of its own card on the basis of the card number identified by the card number identification unit and the correspondence table stored in the correspondence table storage unit, acquires an IP address of the fourth processing card on the basis of the card number that is stored in the fourth processing card number storage unit and associated with the predetermined card slot into which the fourth processing card is to be inserted and the correspondence table stored in the correspondence table storage unit, and performs communication with each processing card by using each of the IP addresses acquired.

* * * * *